US009878690B2

(12) United States Patent
Thompson et al.

(10) Patent No.: US 9,878,690 B2
(45) Date of Patent: *Jan. 30, 2018

(54) VEHICLE COMMUNICATIONS

(71) Applicant: Jaguar Land Rover Limited, Coventry (GB)

(72) Inventors: Simon Thompson, Coventry (GB); Peter Thomas, Coventry (GB); Carl Pickering, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 111 days.

This patent is subject to a terminal disclaimer.

(21) Appl. No.: 14/976,745

(22) Filed: Dec. 21, 2015

(65) Prior Publication Data

US 2016/0129882 A1 May 12, 2016

Related U.S. Application Data

(63) Continuation of application No. 13/699,881, filed as application No. PCT/EP2011/058601 on May 25, 2011, now Pat. No. 9,251,631.

(30) Foreign Application Priority Data

May 25, 2010 (GB) .................................. 1008710.4

(51) Int. Cl.
*B60R 25/01* (2013.01)
*B60R 16/023* (2006.01)
(Continued)

(52) U.S. Cl.
CPC .............. *B60R 25/01* (2013.01); *B60L 1/003* (2013.01); *B60L 3/0069* (2013.01); *B60L 3/04* (2013.01);
(Continued)

(58) Field of Classification Search
None
See application file for complete search history.

(56) References Cited

U.S. PATENT DOCUMENTS 6,687,587 B2 2/2004 Kacel
2002/0015443 A1 2/2002 Felts et al.
(Continued)

FOREIGN PATENT DOCUMENTS

CN 2862218 Y 1/2007
CN 201174048 Y 12/2008
(Continued)

OTHER PUBLICATIONS

Office Action Summary, JP Application No. 2015-156264, dated Aug. 16, 2016, 2 pages.
(Continued)

*Primary Examiner* — Russell Frejd
(74) *Attorney, Agent, or Firm* — Myers Bigel, P.A.

(57) ABSTRACT

A method and apparatus 10 for interacting remotely with a vehicle 12 comprising data transfer means 22 for wirelessly communicating messages between a mobile communications device 18 operable by a user and a vehicle databus 24 located within the vehicle 12. Optionally, the data transfer means 22 is arranged to wirelessly communicate with the mobile communications device 18 via a web server 14, a web portal or other internet-connected host system. The data transfer means 22 may be arranged to wirelessly communicate with the web portal via a GSM or other cellular communications network 13. After the vehicle engine has stopped, communication of messages may continue on an intermittent basis, or may be suspended after a predetermined time has elapsed or when the vehicle battery voltage (Continued)

reaches a predetermined threshold. High priority messages may be communicated at any time after the vehicle engine has stopped.

20 Claims, 16 Drawing Sheets

(51) Int. Cl.
G07C 5/08 (2006.01)
G07C 5/00 (2006.01)
G07C 9/00 (2006.01)
H04L 12/58 (2006.01)
H04L 29/08 (2006.01)
B60L 1/00 (2006.01)
B60L 3/00 (2006.01)
B60L 3/04 (2006.01)
B60L 11/14 (2006.01)
B60L 11/18 (2006.01)

(52) U.S. Cl.
CPC ........... B60L 11/14 (2013.01); B60L 11/1803 (2013.01); B60L 11/1816 (2013.01); B60L 11/1846 (2013.01); B60L 11/1861 (2013.01); B60L 11/1868 (2013.01); B60R 16/023 (2013.01); G07C 5/008 (2013.01); G07C 5/08 (2013.01); G07C 5/0816 (2013.01); G07C 5/0841 (2013.01); G07C 9/00309 (2013.01); H04L 51/26 (2013.01); H04L 67/12 (2013.01); B60L 2210/30 (2013.01); B60L 2210/40 (2013.01); B60L 2240/28 (2013.01); B60L 2240/34 (2013.01); B60L 2240/547 (2013.01); B60L 2240/549 (2013.01); B60L 2240/622 (2013.01); B60L 2240/70 (2013.01); B60L 2240/80 (2013.01); B60L 2250/10 (2013.01); B60L 2250/16 (2013.01); B60L 2260/52 (2013.01); G07C 2009/00507 (2013.01); G07C 2209/62 (2013.01); Y02T 10/70 (2013.01); Y02T 10/7005 (2013.01); Y02T 10/7044 (2013.01); Y02T 10/7066 (2013.01); Y02T 10/7072 (2013.01); Y02T 10/7077 (2013.01); Y02T 10/7241 (2013.01); Y02T 10/7291 (2013.01); Y02T 90/121 (2013.01); Y02T 90/127 (2013.01); Y02T 90/128 (2013.01); Y02T 90/14 (2013.01); Y02T 90/16 (2013.01); Y02T 90/162 (2013.01); Y02T 90/163 (2013.01); Y02T 90/169 (2013.01); Y04S 30/14 (2013.01)

(56) References Cited

U.S. PATENT DOCUMENTS

| 2002/0105443 | A1 | 8/2002 | Flick |
| 2003/0120395 | A1 | 6/2003 | Kacel |
| 2004/0204796 | A1 | 10/2004 | Harvey et al. |
| 2008/0032685 | A1 | 2/2008 | Talty et al. |
| 2008/0032721 | A1 | 2/2008 | MacDonald et al. |
| 2008/0046172 | A1 | 2/2008 | Ames et al. |
| 2008/0089298 | A1 | 4/2008 | Anschutz et al. |
| 2008/0238642 | A1 | 10/2008 | Mauti |
| 2008/0268838 | A1 | 10/2008 | Zufall et al. |
| 2009/0276120 | A1 | 11/2009 | Harvey et al. |
| 2010/0063670 | A1 | 3/2010 | Brzezinski et al. |
| 2010/0097239 | A1 | 4/2010 | Campbell et al. |
| 2010/0115505 | A1 | 5/2010 | Touati et al. |

FOREIGN PATENT DOCUMENTS

| DE | 19823122 A1 | 12/1999 |
| JP | 09331288 A | 12/1997 |
| JP | 1120616 A | 1/1999 |
| JP | 2002-087185 | 3/2002 |
| JP | 2005028951 A | 2/2005 |
| JP | 2006-025048 | 1/2006 |
| JP | 2006089021 A | 4/2006 |
| JP | 2009055301 A | 3/2009 |
| WO | WO 2005/008603 A1 | 1/2005 |
| WO | WO 2006/112274 A1 | 10/2006 |

OTHER PUBLICATIONS

Notification of the Second Office Action, CN 201180036047.8, dated Aug. 5, 2015, 24 pages.
GigaOM—Josie Garthwaite: "GM's Volt to Launch With Cell Phone App for Remote Control," GigaOM, Jan. 6, 2010, XP002561074, Retrieved from Internet: URL:http://gigaom.com/cleantech/gms-volt-to-launch-with-cell-phone-app-for-remote-control/ [retrieved on Jan. 17, 2013, original citation retrieved on Jul. 19, 2011].
International Preliminary Report on Patentability for International Application No. PCT/EP2011/058601, dated Nov. 27, 2012, 7 pages.
International Search Report for International Application No. PCT/EP2011/058601, dated Aug. 16, 2011, 4 pages.
Written Opinion for International Application No. PCT/EP2011/058601, dated Aug. 16, 2011, 6 pages.

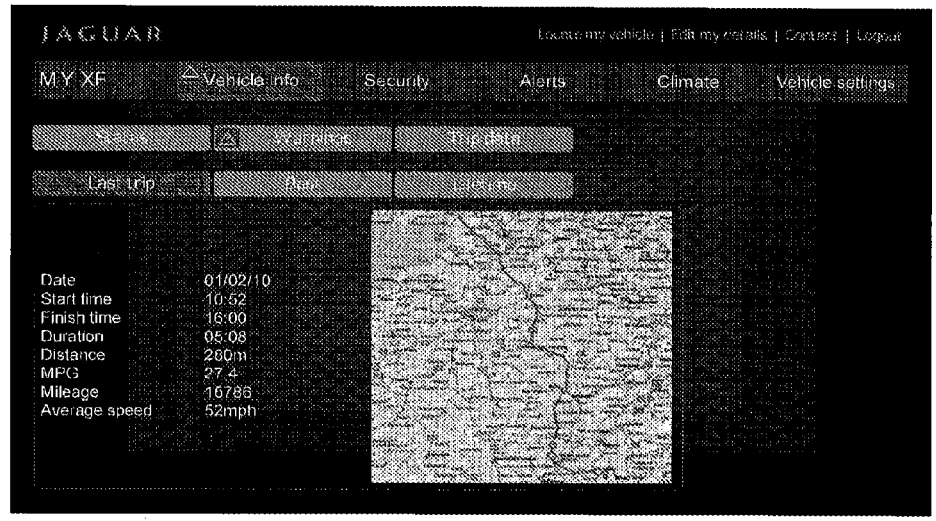
Fig. 15(a)
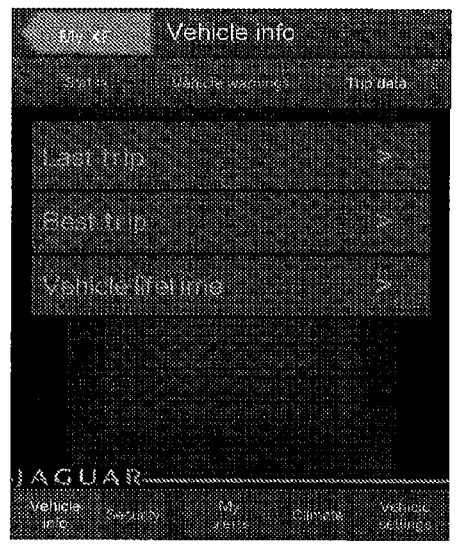 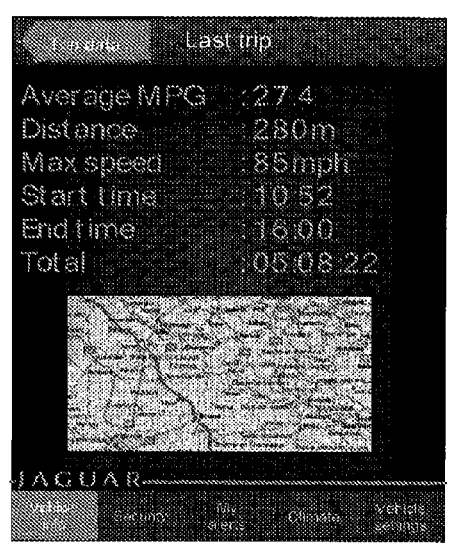
Fig. 15(b)  Fig. 15(c)

VEHICLE COMMUNICATIONS

This application is a continuation application of U.S. patent application Ser. No. 13/699,881, which is now U.S. Pat. No. 9,251,631, filed May 1, 2013, which is a 35 U.S.C. § 371 national stage application of PCT Application No. PCT/EP2011/058601, filed on May 25, 2011, which claims the benefit of and priority to Great Britain Patent Application No. 1008710.4, filed on May 25, 2010, the disclosures of which are incorporated herein by reference as if set forth in their entireties.

The present invention relates to vehicle communications and particularly, but not exclusively, to an apparatus, system and/or method for remotely interacting with (e.g. communicating with and/or controlling) a vehicle such as an automobile. The present invention may also find application in remotely communicating with, or controlling, other items, objects or property such as a house or building. Aspects of the invention relate to an apparatus, to a system, to a vehicle and to a method.

Several attempts have been made to develop a system to enable remote communication with a vehicle. These systems generally use conventional telecommunications networks to send messages to a mobile communications device of the driver. Heretofore, however, various technical difficulties have prevented such systems from becoming widely available.

Many vehicle owners would welcome the ability to monitor and/or control the status of their vehicle remotely. It is frequently the case that vehicle owners are forced to park their vehicles out of sight of, or at some distance from, their normal location. For example, people commuting to work via train often leave their vehicles in station car parks. It is rare that a driver is always able to leave the vehicle unattended in a location visible to him.

It would be comforting to the driver to be able to confirm the status of his vehicle, and preferably to control certain aspects of the vehicle, remotely. It is an aim of the present invention to address this issue. Embodiments of the invention may provide an improved apparatus, system or method for monitoring and/or controlling the status of a vehicle using a mobile telecommunications device. Other aims and advantages of the invention will become apparent from the following description, claims and drawings.

Aspects of the invention therefore provide an apparatus, system, vehicle and method as claimed in the appended claims.

According to another aspect of the invention for which protection is sought, there is provided a system for monitoring and/or controlling a vehicle comprising control means for receiving data signals transmitted on the vehicle CAN bus relating to the status and/or operation of one or more vehicle systems or devices and communication means for transmitting information relating to one or more of said received data signals to a mobile communications device for display to a user.

The communication means may be arranged to transmit the received data signals to the mobile communications device via a standard GSM network or other cellular communications network.

In one embodiment, the communications means is arranged to transmit the information to the mobile communications device directly via the communications network in the manner of a conventional user-to-user arrangement. Alternatively, or in addition, the communication means may be arranged to transmit the information to the mobile communications device via an intermediate system.

For example, the communication means may be arranged to transmit the information relating to the received data signals to an internet-connected computer system, hereafter termed a web portal, for processing and display, and/or for onward transmission to the mobile communications device. The web portal may consist of a graphical user interface (GUI) in the form of a web page hosted on an internet-connected web server and accessible by conventional internet browser software. The web portal may be arranged to transmit and receive communication signals via the GSM network using one or more third party service providers, such as SMS messaging service providers, VOIP service providers or email service providers In one embodiment, the communication means is arranged to transmit the received control signals in the form in which they are received from the CAN bus. Alternatively, or in addition, the control means may be arranged to receive the control signals from the CAN bus and convert the control signals into data signals corresponding to the control signals.

For example, the control means may be arranged to identify or interpret each received CAN signal by comparing the received control signal with a reference list of control signals in a look-up table stored in an associated memory, such as NVRAM, or other data storage portion. This arrangement may advantageously preclude the transmission of vehicle specific CAN messages externally of the vehicle which could be intercepted by unauthorised persons or persons with malicious intent.

The mobile communications device may comprise a software program, application or graphical user interface for displaying to the user information relating to the status and/or operation of the vehicle based on the received data. The data may be in the form of an email, SMS message, VOIP message, telephone call or data alert.

In one embodiment, the communication means comprises a transmitter/receiver (transceiver) arrangement that is connected to the vehicle CAN bus or other data or communications network. The communications means may comprise a GSM transceiver arranged to transmit and receive data over a conventional GSM communications network.

The control means may be arranged not only to receive CAN packets transmitted on the CAN bus by other microprocessors and devices, but also to generate CAN messages for the purpose of controlling said microprocessors and devices. For example, the system may be arranged such that the user, on receiving an alert or message relating to the status of the vehicle, may instruct the web portal via the mobile communications device to transmit an instruction via the GSM network to the transceiver. When received by the transceiver, the control means converts the instruction into an appropriate CAN message by means of a look-up table or the like, and transmits the CAN message onto the CAN bus. This message is received and actioned by the relevant processor or device.

In one example, the software or application (commonly referred to as an "app", such as an iPhone® app, Blackberry app or Nokia app) on the mobile communications device may permit the user to select an "engine start" instruction by means of the GUI. Once selected, the mobile communications device transmits the "engine start" instruction via the normal GSM communications network to the web portal. The instruction is then relayed by the GSM network to the transceiver device in the vehicle. The control means within the transceiver device receives the instruction and compares this with a reference list of instructions contained in a look-up table stored in a memory portion of the control means. From the look-up table, the control means identifies the CAN control signal corresponding to "engine start" and then generates the control signal and transmits it onto the CAN bus. The engine start CAN control signal is received by the vehicle engine control unit (ECU) which responds by starting the engine.

In some territories, it is illegal to perform engine start on an unmanned vehicle on public roads. In this case, for example, the GUI may display a warning to the user concerning this and/or may request confirmation that engine start is intended.

Alternatively, or in addition, on receipt of the engine start instruction, the control means may request vehicle position information from the vehicle GPS or satellite navigation system. Alternatively, the control means may include a GPS receiver for determining vehicle location. If the vehicle is deemed to be on a public road, the system may prevent the engine from being started. Vehicle orientation, i.e. direction, for example derived from the GPS data, may also be used to determine whether the vehicle is on a public road, or on private property adjacent to a road. For example, if the GPS data suggests that the vehicle is positioned on a public road, but the orientation (heading) of the vehicle is not consistent with normal road use, the system may determine that the vehicle is positioned on private property adjacent to a public road.

The control means may comprise a conventional stolen vehicle tracking unit.

The type or nature of the alert may be selected by the user using the web portal. For example, communication between the web portal and the mobile communications device may take the form of an email, an SMS message, a VOIP call or standard telephone call with pre-recorded voice message. Different types of message may be selected for different alerts.

Within the scope of this application it is envisaged that the various aspects, embodiments, examples, features and alternatives set out in the preceding paragraphs, in the claims and/or in the following description and drawings may be taken individually or in any combination thereof.

The present invention will now be described, by way of example only, with reference to the accompanying drawings, in which.

FIGS. 3(a)-15(e) represent screen shots from a web portal and/or mobile device GUI for operating and/or controlling the system of the invention.

Figure 1:
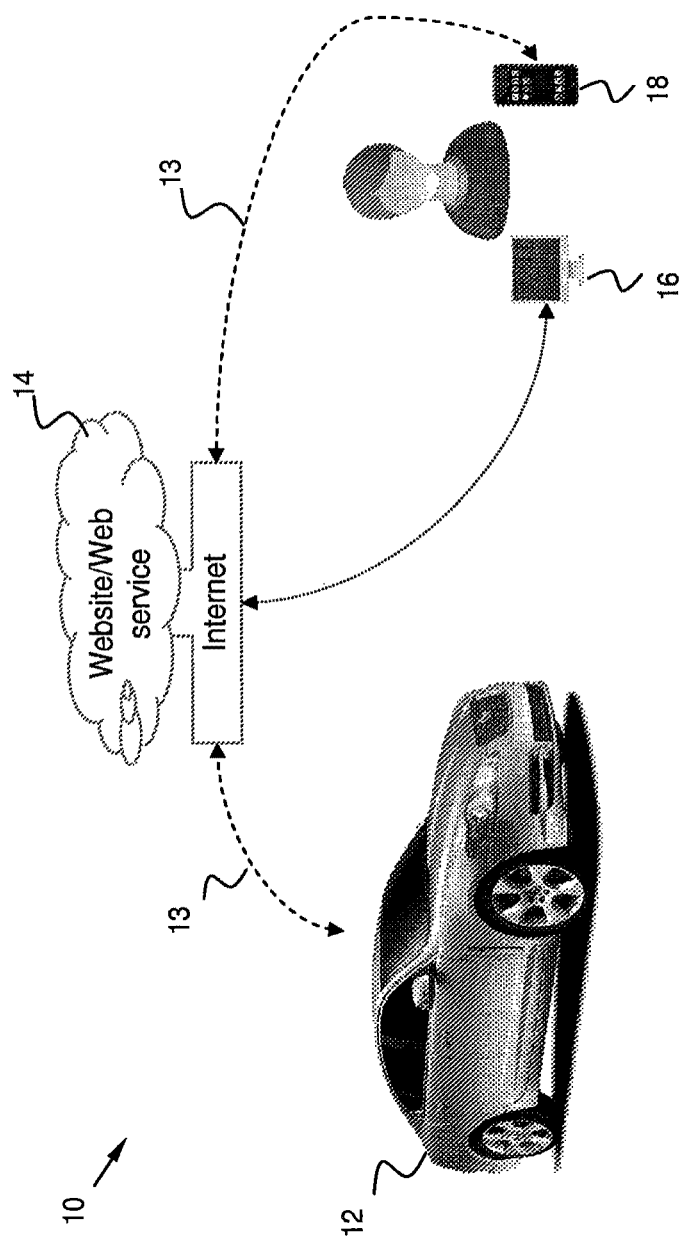
FIG. 1 illustrates conceptually a system embodying one form of the present invention.

Referring firstly to FIG. 1, a system embodying one form of the invention is shown conceptually at reference numeral 10. A vehicle 12 is fitted with a data transceiver unit or DTU 22 (shown in FIG. 2) which is capable of wirelessly receiving and transmitting data to and from the vehicle 12.

Data transmitted from the vehicle 12 is sent, via a conventional GSM or other wireless or cellular network, to an internet connected, externally-hosted web site or web portal 14. The graphical user interface (GUI) of the web portal 14 allows the received data transmitted from the vehicle 12 to be displayed or presented to the user who can connect to the web portal through any conventional internet-connected device such as a personal computer 16.

In addition, in the illustrated embodiment, the web portal 14 is arranged, either automatically or on request, to transmit some or all of the received data to one or more mobile communications devices 18 (hereafter termed, for convenience, mobile devices, a term that includes devices such as smart phones and laptop computers).

Figure 3A:
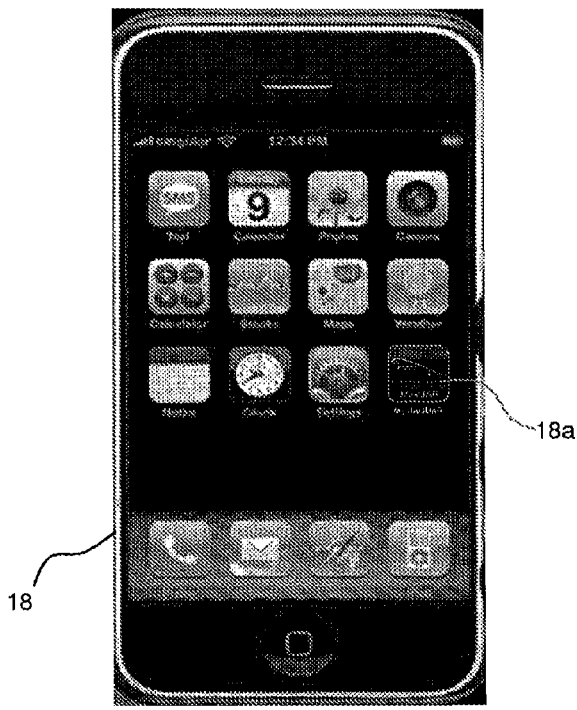

The mobile device 18 may itself have a GUI that permits the data to be displayed in a user-friendly manner. FIG. 3(a) shows a mobile device 18 having a GUI displaying an icon 18a corresponding to an app that is configured to communicate with the web portal 14.

Figure 3B:
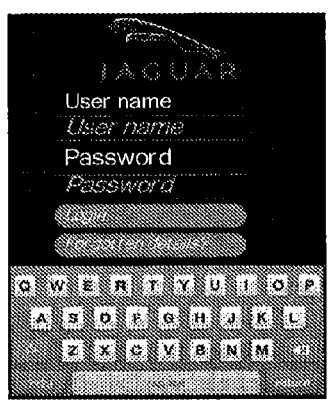
Figure 3C:
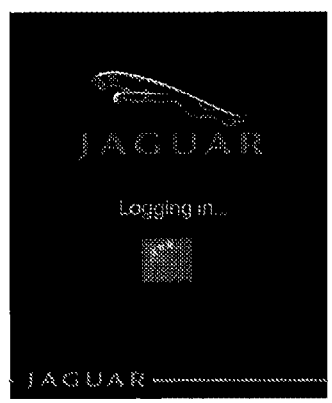
Figure 3D:
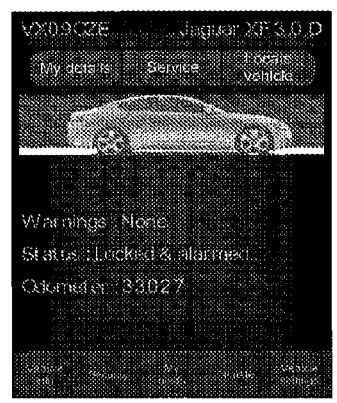

FIG. 3(b) is a screenshot of a log-on screen that is presented to a user of the mobile device 18 when the app is run. After entering a valid username and password the mobile device 18 is permitted to log in to the web portal 14 (FIG. 3(c)) whereupon a homepage is presented to the user. FIG. 3(d) is a screen sot of a homepage that has been customised by a user to display warnings, a status of the vehicle 12 (in this case the vehicle 12 is in a 'locked and alarmed' state) and an odometer reading.

Figure 4:
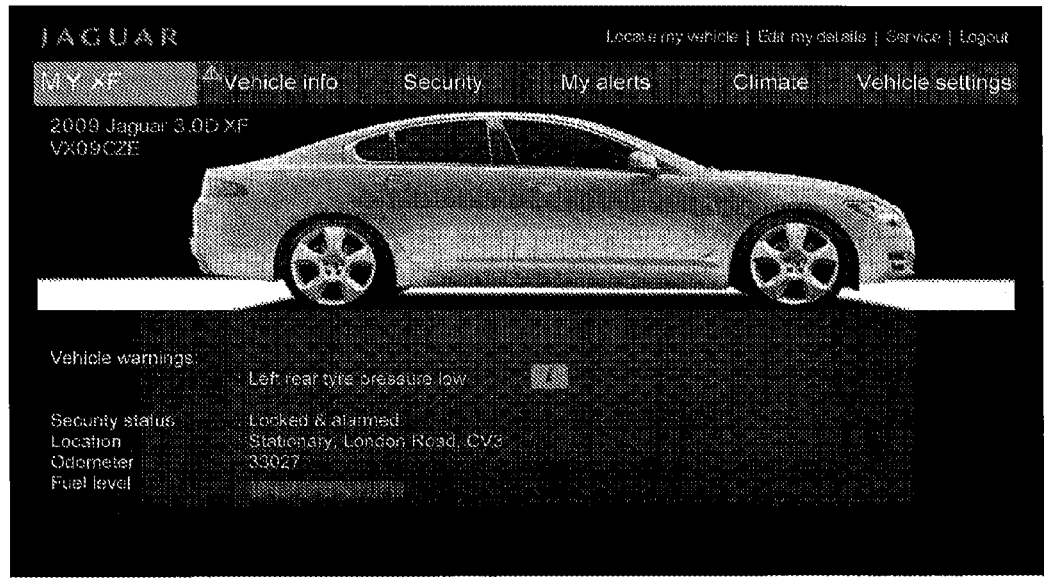

FIG. 4 is a screenshot of a homepage in which a warning is being displayed to the user that a tyre pressure is low (in this case a left rear tyre pressure). The vehicle type, registration number, odometer reading and fuel level is also displayed on the homepage in the example shown.

On the other hand, the web portal 14 is also arranged to receive data signals from the mobile device 18 and, either automatically or on request, to transmit some or all of the data signals to the vehicle.

The web portal 14 thus acts as an intermediate node in a two-way communications network between the vehicle and the user's mobile device 18. It is arranged to receive wireless data transmitted by the vehicle 12 via a standard GSM or other wireless or cellular network 13, and to re-transmit selected parts, or all, of the data to the mobile device 18 for display to the user via the same wireless or cellular network 13, for example by means of SMS text, VOIP or email. On the other hand, the web portal 14 is also arranged to receive control data from the user's mobile device 18 via the wireless or cellular network 13, and to re-transmit the control data to the vehicle 12.

Figure 2:
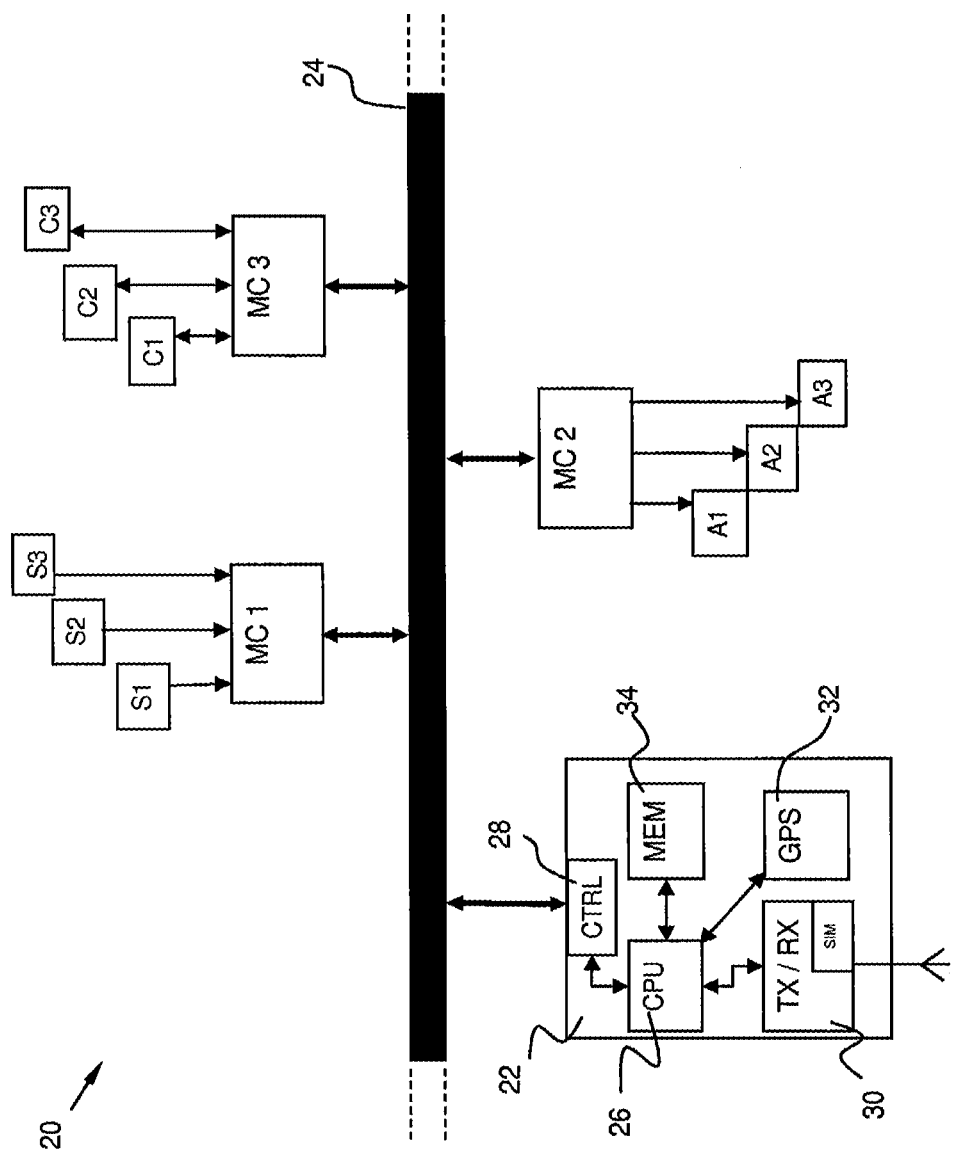
FIG. 2 is a schematic representation of a vehicle data network showing parts of the system of FIG. 1 connected thereto.

Referring next to FIG. 2, this illustrates, in schematic form, part of a vehicle communications network 20. The network 20 comprises a plurality of electronic devices, including microcontrollers MC1-MC3, each connected to a common data bus in the form of a controller area network (CAN) bus 24. CAN bus networks are conventionally used for enabling vehicle systems and microcontrollers to communicate with each other without requiring a host controller and will be well understood by those skilled in the art. It will also be understood that while the majority of commercially available vehicles utilise the CAN protocol, the present invention is equally applicable to use with other forms of data buses or protocols.

Automotive vehicles generally have a large number of microcontrollers or electronic control units (ECUs) connected to the CAN bus 24, only three of which are shown in FIG. 2. Each of the microcontrollers MC1-MC3 is arranged to communicate with and/or control at least one vehicle subsystem including core systems such as the engine and transmission, safety systems such as the airbags and antilock brake, security systems such as the door locks, windows and vehicle alarm and immobiliser, and convenience features such as heated seats, electric mirrors, HVAC, cruise control etc. In many cases, communication between subsystems is essential.

Each subsystem may comprise one or more sensors, actuators or control devices which are connected to the CAN bus 24 via a respective microcontroller. For example, the vehicle door locking system may comprise, for each vehicle door, a control device in the form of one or more door locking switches operable by the vehicle user, an actuator for activating or deactivating the locking mechanism on the door, and a sensor for detecting the lock/unlock status of the door. The control devices and sensors are connected to control inputs on the respective microcontroller while the actuators are connected to control outputs on the microcontroller.

Communication between the various subsystems is achieved via data messages or packets transmitted onto the CAN bus 24 by the microcontrollers. In general, each message (hereafter referred to as a CAN message) consists of an identifier (ID), comprising a number of bytes for identifying the message type or transmitting subsystem, and a data packet containing the main body of the message, transmitted serially onto the bus. Because the CAN protocol is a multimaster broadcast serial bus protocol which is not controlled by a host processor, each CAN message is received by all nodes on the CAN bus 24 and each node is able to transmit and receive CAN messages, though not simultaneously.

According to the illustrated embodiment of the invention, the system comprises a data control unit in the form of a data transfer unit (DTU) 22 that is connected to the CAN bus 24 in a manner substantially identical to that of the microcontrollers MC1-MC3. In a particularly advantageous embodiment, the DTU 22 is detachably connectable to the CAN bus 24 via a diagnostic port on the vehicle using a standard adapter plug or connector. This enables the system to be easily transferred between vehicles.

The DTU 22 comprises processor means in the form of a microprocessor 26 that communicates with the CAN bus 24 via a CAN controller 28. The microprocessor 26 is connected to transceiver means in the form of a wireless transceiver unit 30, to position sensing means in the form of a GPS receiver unit 32 and to memory means in the form of a non-volatile random access memory (NVRAM) module 34.

The wireless transceiver unit 30 is a conventional transmitter/receiver device capable of transmitting and receiving data via a standard GSM or other cellular telecommunications network using a registered SIM card. Such transceiver units are commonly found in so-called vehicle tracker or locator systems and will be well known to the skilled person.

The GPS receiver unit 32 is a conventional GPS receiver as found in vehicle navigation systems or stolen vehicle locator systems and is arranged to determine the geographical position of the vehicle 12. Again, the function and operation of such devices will be familiar to the skilled person.

The microprocessor 26 is arranged to receive, via the CAN controller 28, all of the CAN messages transmitted onto the CAN bus 24 by the microcontrollers throughout the vehicle 12. On receiving a CAN message from the CAN bus 24, the microprocessor 26 accesses a look-up table stored in the memory module 34 to determine whether the received CAN message appears in a reference list of CAN messages contained in the table.

Within the look-up table, each CAN message in the reference list is associated with, inter alia, a specific event or status change within subsystems or electronic devices of the vehicle 12. The microprocessor 26 thus compares the received CAN message with the CAN messages listed in the look-up table and identifies the event or status change (hereafter referred to as event message or status message, respectively).

Depending on the nature of the CAN message, and other conditions described below, the microprocessor 26 is arranged to instruct the transceiver unit 30 to transmit the event or status message to the web portal 14 using the GSM cellular telecommunications network 13. Advantageously, the event and status messages comprise information that represents the CAN message received from the CAN bus 24, but does not include the CAN message itself. This improves security since it is generally undesirable to transmit raw CAN messages wirelessly.

The web portal 14 receives the transmitted event or status message via the GSM network 13 and processes the information accordingly, as described below. For example, the web portal 14 may be arranged to store the information in a database for reference by the user. The data can be viewed directly on the web portal 14 from any internet connected device, such as a personal computer 16 or mobile communications device 18.

In addition, depending on the nature of the CAN message and other conditions described below, the web portal 14 sends an alert message over the GSM network 13, for example as an SMS text message, VOIP or email, to the user's mobile device 18, informing the user of the event or status change within the vehicle 12.

On the other hand, the transceiver unit 30 within the DTU 22 is also arranged to receive incoming data messages from the web portal 14 over the GSM cellular telecommunications network 13. Such messages may comprise control messages for controlling systems or functions on the vehicle remotely.

When the transceiver unit 30 receives a message transmitted over the GSM network 13, the message is passed to the microprocessor 26 which then accesses the look-up table in the NVRAM module 34 to determine the correct CAN message for effecting the control request.

For example, the received control message might comprise the instruction "lock doors". In this case, the microprocessor 26 locates the instruction "lock doors" in the look-up table and then identifies the corresponding CAN message code, i.e. in the CAN protocol format comprising one or more ID bits and a plurality of information bits, as described above.

When the appropriate CAN message corresponding to the received control message is identified in the look-up table, the microprocessor 26 generates the CAN message and transmits it onto the CAN bus 24. The CAN message is received by the node (microcontroller) for the door locking system which then locks the doors in response thereto.

The CAN message generated by the DTU 22 in response to the received control message is indistinguishable, or substantially indistinguishable, from the CAN message that would normally be generated if the instruction had been triggered by the relevant system or sub-system itself. Thus, the microcontroller responsible for locking the vehicle doors reacts in the same way as if the instruction had come from the key fob or door lock switches. This is true of all CAN messages transmitted onto the CAN bus 24 by the DTU 22.

Importantly, therefore, the DTU 22 is capable not only of receiving and interpreting CAN messages received from the CAN bus 24, but also of generating CAN messages, in the correct CAN protocol format, and transmitting them onto the CAN bus 24 in order to control the vehicle systems and subsystems.

The look-up table stored in the NVRAM module 34 functions as a translation tool for converting CAN messages received from the CAN bus 24 into event or status messages for transmission to the web portal 14 via the GSM network 13, and for converting received control messages from the web portal 14 via the GSM network 13 into CAN messages for transmission onto the CAN bus 24.

It will be appreciated from the above that the status and event information that can be transmitted to the web portal 14, and hence to the user's mobile device 18, and the control information that can be transmitted to the vehicle 12 from the user's mobile device 18 via the web portal 14 is generally limited only by the types of CAN messages available under the CAN protocol.

Substantially any message relating to an event or vehicle status that is normally transmitted between systems on the vehicle CAN bus 24 can be received, translated and transmitted from the vehicle 12 to the web portal 14 via the GSM network 13. Once received by the web portal 14, the information is stored and can be displayed to the user in a conventional, user-friendly and/or user-configurable manner.

In addition, if desired, the event or status information can be re-transmitted by the web portal 14 to the user's mobile device 18, by any desired method such as SMS text, VOIP or email (selectable by the user on the GUI of the web portal 14) to alert him of the status or event within the vehicle 12.

Likewise, substantially any control message corresponding to a CAN message that is normally transmitted between systems on the vehicle CAN bus 24 can be generated and transmitted by the web portal 14, received over the GSM cellular network 13 by the transceiver unit 30 in the DTU 22, converted into the appropriate CAN message (i.e. in CAN protocol format) by the microprocessor 26 using the look-up table in the NVRAM module 34 and transmitted onto the CAN bus 24 for reception by the appropriate microcontroller MC1-MC3.

The user can select which control messages are transmitted to the vehicle 12 by accessing the web portal 14 by any internet connected device 16, or by uploading the desired control messages to the web portal 14 by means of the mobile device 18. The mobile device 18 includes a GUI which is able to display substantially the same information and control features as the web portal 14.

In one advantageous embodiment, the mobile device 18 features on-board application software (commonly known as an app) which provides substantially the full read/write functionality of the web portal 14. Thus, event or status information received from the vehicle 12 via the web portal 14 can be displayed graphically or audibly to the user, and control messages (e.g. instructions) can be input to the mobile device 18 using the GUI or keypad for transmission to the vehicle 12 via the web portal 14.

In one example, the user is able to request status information from the vehicle 12 by uploading a "status request" message to the vehicle. In this case, the user can make the request on the web portal 14 directly, via an internet connected computer or laptop 16 (in which case the request is transmitted to the web portal 14 via the internet) or using the application software on the mobile device 18 (in which case the request is transmitted to the web portal via the GSM network 13.)

When the web portal 14 receives the status request from the user, the message is transmitted to the vehicle 12 over the GSM network 13 where it is received by the transceiver unit 30 in the DTU 22 and converted into the appropriate CAN message (i.e. in CAN protocol format) by the microprocessor 26. On receipt of the CAN message, each of the microcontrollers MC1-MC3 interrogates the various vehicle sensors S1-S3, actuators A1-A3 and control devices C1-C3, in a conventional manner, and transmits the relevant CAN messages corresponding to the determined system status onto the CAN bus 24. The CAN messages are received, sequentially, by the microprocessor 26 via the CAN controller 28 and converted into status messages for transmission to the web portal 14 and/or user's mobile device 18 via the GSM network 13.

The status request issued by the user can be a global status request, in which all status information is transmitted to the web portal 14 by the DTU 22 and then downloaded to the user's mobile device 18, or a status request for a specific vehicle system or subsystem, such as door locked status.

The applicant has reduced to practice a fully functional and working version of the invention. FIGS. 3*b*-15(*e*) illustrate GUI screen shots of the web portal and mobile device application software for an embodiment of the invention. Most of these are self explanatory from the content and will thus be fully understood by the skilled person.

Nevertheless, various advantageous functions of certain embodiments of the invention will now be described. It will be appreciated that the described functions may be taken individually or in any combination, depending on user preference, and these are not intended to limit the invention in any way.

For the purposes of this application, the term "status" means, among other definitions, the measured state of a vehicle system, subsystem or parameter. The term "event" means, among other definitions, a change of state of a monitored system or subsystem. Each status or event reading is transmitted to the host either automatically, by predetermined or selected criteria, or on request.

Vehicle Status

An important function of the present invention is the ability of the user to remotely determine the status of various vehicle systems and sub-systems. In one embodiment of the invention, this can be achieved in one of at least two ways:

a) Automatic

During normal, engine-on conditions, CAN messages transmitted onto the CAN bus 24 by the vehicle systems and subsystems are received by the DTU 22. Certain CAN messages, which are of no relevance to the system of the present invention, are ignored by the microprocessor 26. Other CAN messages, which are contained in the reference list in the look-up table, are of relevance to the system and are stored in the NVRAM module 34.

As the status of vehicle systems or subsystems changes, triggering event messages on the CAN bus 24, the messages stored in the NVRAM module 34 are refreshed. For example, if the fuel level drops from 50% to 40%, a corresponding CAN message may be generated on the CAN bus 24 and received by the DTU 22. The microprocessor writes the status information relating to fuel level in the NVRAM 34. It will be appreciated that, when the vehicle engine is stopped and/or when the ignition key (if there is one) is removed, the NVRAM 34 contains the current status information for a plurality of vehicle systems or subsystems.

On engine stop, an <ENGINE STOP> event (CAN message) is generated by the engine control unit (ECU) and transmitted onto the CAN bus 24 to be received by other, interrelated subsystems. According to the present embodiment, on receipt of the <ENGINE STOP> CAN message, the microprocessor 26 in the DTU 22 causes the current status information stored in the NVRAM module 34, which represents the latest status information for the vehicle systems prior to engine stop, to be transmitted to the web portal 14 by the transceiver unit 30 via the GSM network 13, as described above.

This "bulk dump" of vehicle status information on engine stop enables the web portal 14 to receive and store all status information relating to the vehicle systems at the time the engine was stopped. The user is therefore able to request vehicle status information from the web portal 14, without the need for the web portal to request the information from the vehicle 12. It is to be understood that this has the advantage in some embodiments that drain of the vehicle battery may be reduced.

b) User Request

Nevertheless, there may be occasions when the user requires confirmation of the status of the vehicle systems after engine stop. Alternatively, it is possible that the status of certain vehicle systems may change after engine stop. For example, the user may wish to find out the cabin temperature before using the vehicle, in order to decide whether to issue a control instruction to activate the vehicle HVAC (see below).

If such status information is required the user can communicate with the web portal 14 either using an internet connected computer 16 or using the application software on the mobile device 18 to cause the web portal to generate a status request (control message) for the vehicle subsystem of interest. The status request is transmitted by the web portal 14 to the vehicle 12 over the GSM network 13, as described above, received and interpreted by the DTU 22 and transmitted onto the CAN bus 24 as a CAN message in CAN protocol format.

The status response (CAN message) received from the corresponding microcontroller on the CAN bus 24 is converted into the corresponding status message by the DTU 22 and transmitted back to the web portal 14 over the GSM network. The relevant status information is then stored in the database on the web portal for display to the user or, if required, is transmitted to the mobile device 18 in any desired format.

Climate

Figure 5A:
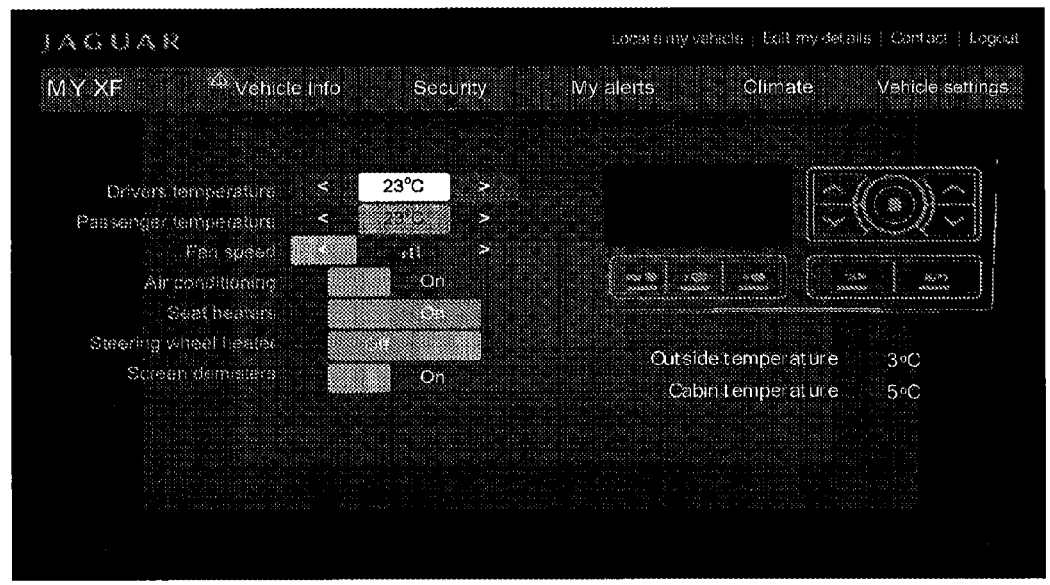
Figure 5B:
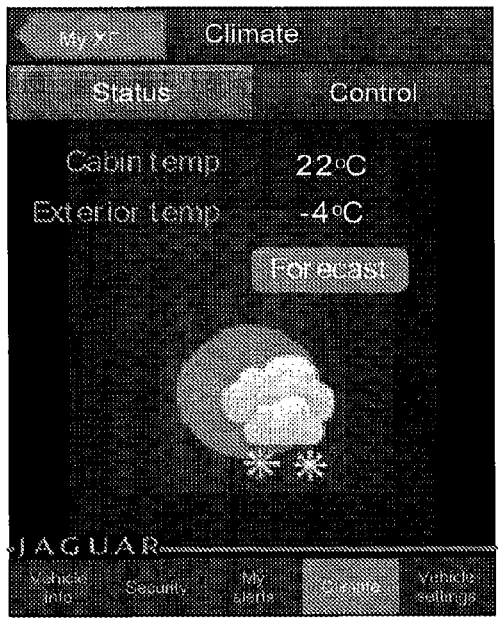
Figure 5C:
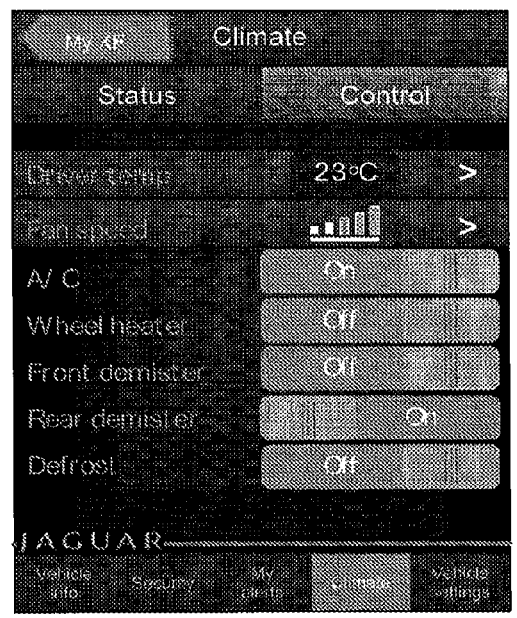
Figure 6A:
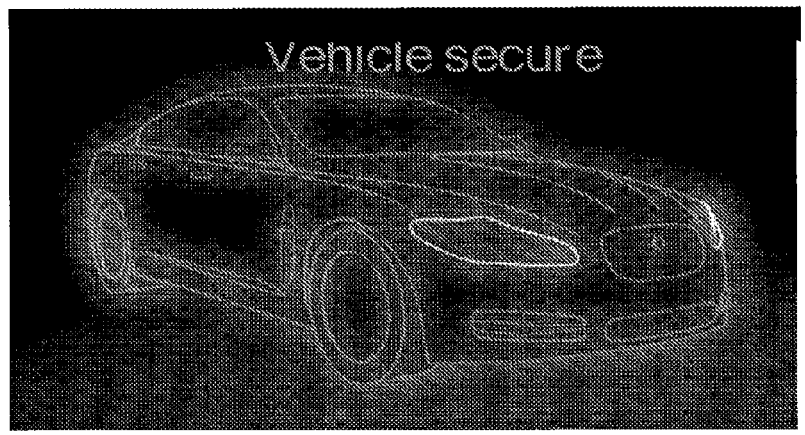
Figure 6B:
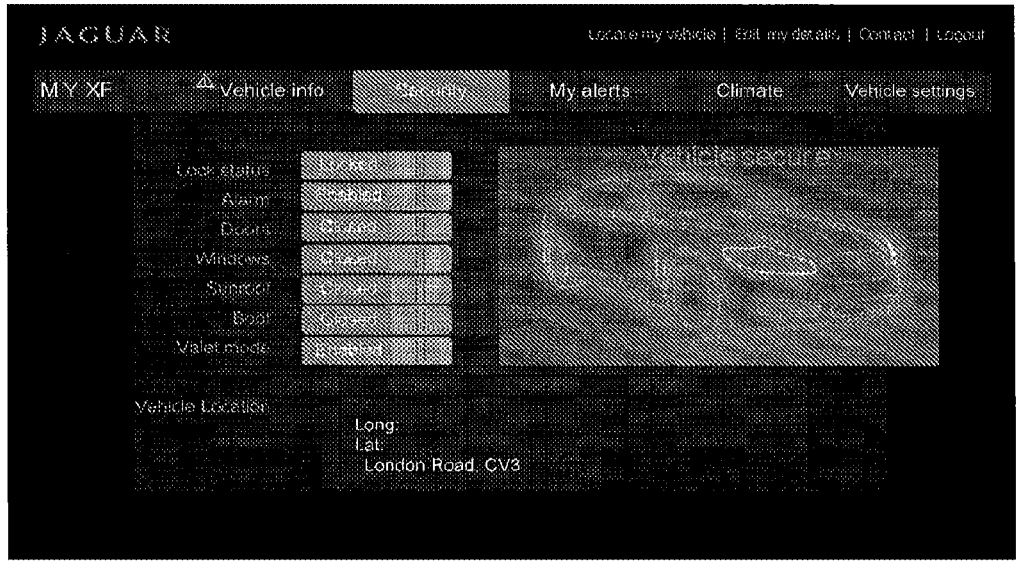
Figure 6C:
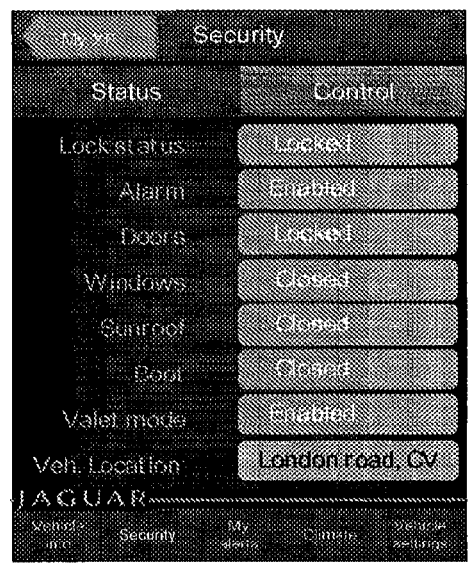
Figure 6D:
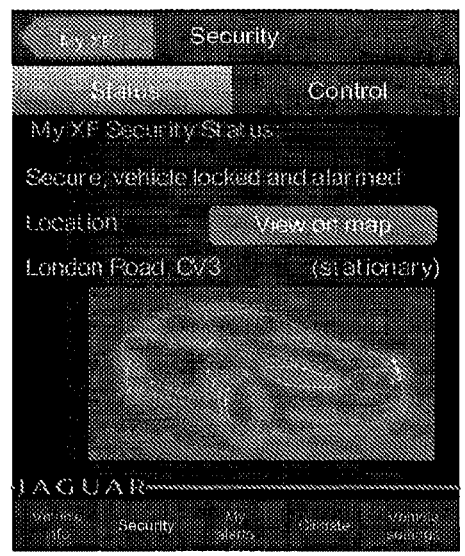

FIG. 5(*a*) is a screenshot of a mobile device 18 showing climate information requested by a user. The screenshot shows that the driver and passenger air temperature selected by the climate control system is 23° C. and the fan speed is set to low. It can also be seen that the air-conditioning, seat heaters and screen demisters are switched on whilst the steering wheel heater is switched off.

The screenshot also shows that the outside air temperature is 3° C. and the cabin temperature is 5° C.

FIG. 5(*b*) is a screenshot of a mobile device 18 having an alternative presentation of climate data showing a climate status of the vehicle. It can be seen that the cabin temperature is 22° C. and the exterior temperature is −4° C. An icon indicative of a weather forecast is also presented to the user.

In some embodiments the weather forecast is obtained by the web portal 14 from an internet-based weather data server.

FIG. 5(*c*) is a screen shot of a mobile device 18 showing climate information requested by a user. The screenshot shows that the driver air temperature selected by the climate control system is 23° C. and the fan speed is set to low. It can also be seen that the air-conditioning, wheel heater, front demister and screen defroster are switched off whilst the rear demister is switched on.

Security

FIG. 6 shows screen shots of a GUI of a mobile device 18 indicating a security state of a vehicle 12. The screenshot of FIG. 6(*a*) indicates that the vehicle is secure, i.e. that the doors, bonnet and tailgate are locked, the windows are closed and the alarm has not been triggered.

If the user requests further information about the vehicle state, such information may be presented to the user. For example, such further information may include, but is not limited to, a mileage reading from the vehicle odometer, tyre pressure status, lamp status, fuel status, and oil status. The user may also request information relating to whether the vehicle is occupied, for example if there is an intruder hiding in the vehicle (e.g. by acoustic monitoring within the vehicle to detect a human heartbeat). Additionally, the user may request information relating to remaining parking time at a specific location (if applicable) and vehicle service information, e.g. when the next service is due.

For example, if the vehicle is in the 'secure state' of FIG. 6(*a*) the user may obtain confirmation of the status of different vehicle systems relating to security of the vehicle. FIG. 6(*b*) is a screenshot from the mobile device 18 following a request for such information.

In the embodiment shown the GUI is also arranged to show the location of the vehicle.

FIGS. 6(*c*) and (*d*) show screenshots showing similar information on a mobile device 18 of lower screen resolution, where the information is presented over two separate user-selectable screens.

Figure 7A:
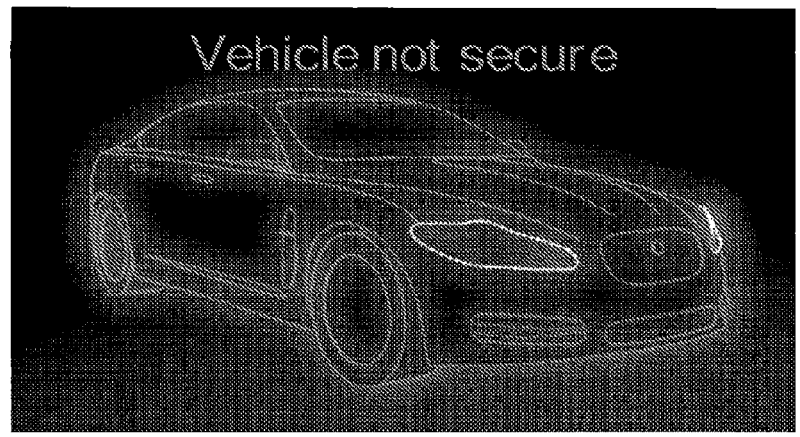
Figure 7B:
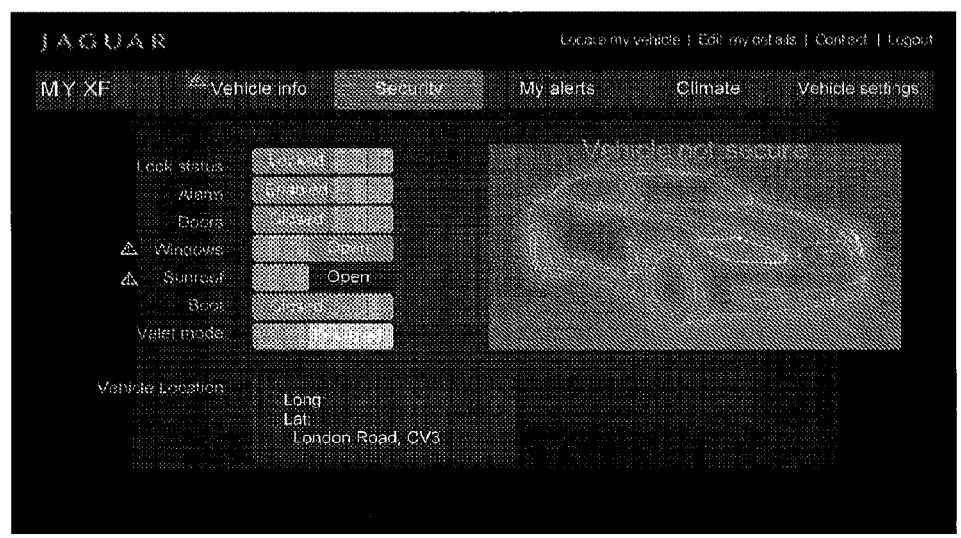

FIG. 7(*a*) is a screenshot indicating that the vehicle 12 is not secure, i.e. that at least one door, the bonnet or tailgate is not locked, and/or at least one window is not closed.

FIG. 7(*b*) is a screenshot of a mobile device 18 when the vehicle 12 is in such a 'not secure' state and the user has requested further information about the vehicle state beyond that presented in the screenshot of FIG. 7(*a*). It can be seen from the screenshot of FIG. 7(*b*) that the windows and sunroof of the vehicle 12 are open and that the alarm function of the vehicle 12 is enabled.

Figure 8A:
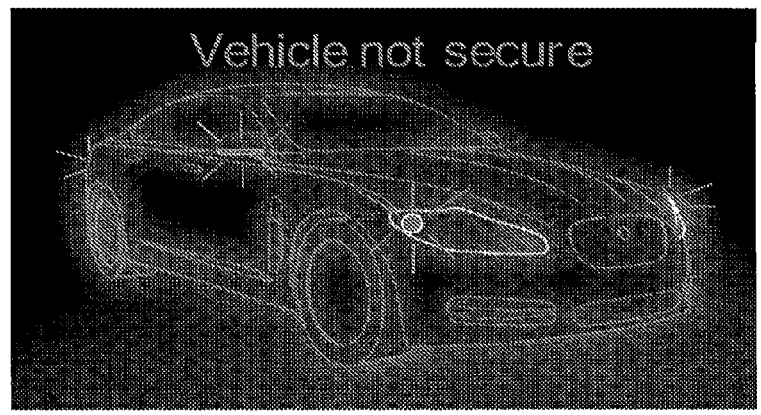
Figure 8B:
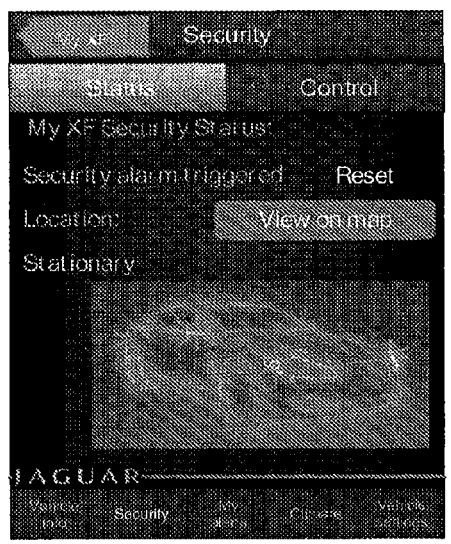
Figure 8C:
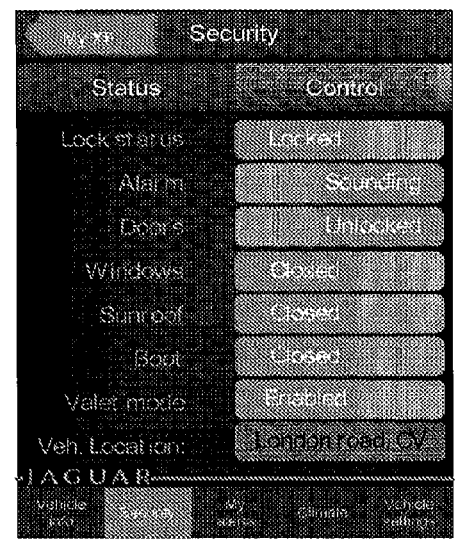

FIG. 8(*a*) is a screenshot indicating that the vehicle 12 is not secure and the vehicle alarm has been activated at least once since the vehicle 12 was last attended by the user.

FIGS. 8(*b*) and (*c*) are corresponding screenshots showing further information in respect of the vehicle 12. It can be seen in FIG. 8(*c*) that the vehicle 12 is reported to be in a state in which the alarm is sounding and the doors are unlocked.

Vehicle Information

Figure 9A:
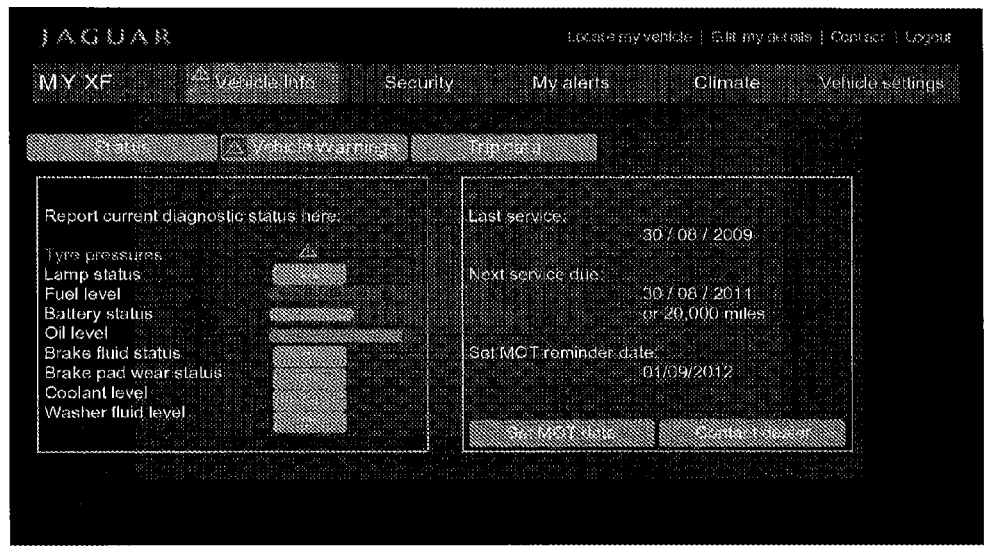
Figure 9B:
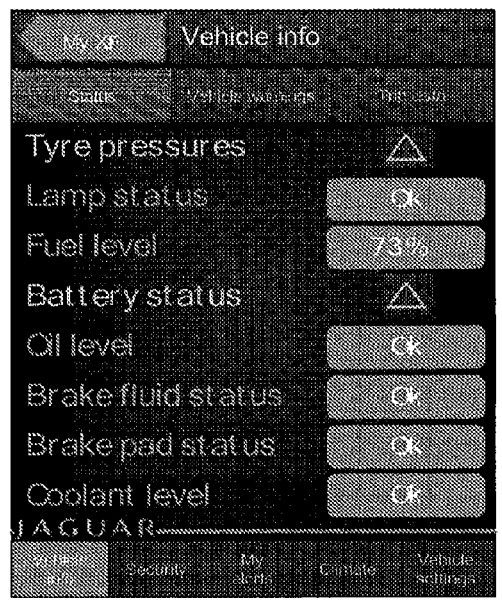

FIG. 9 shows screen shots of a GUI of a mobile device 18 indicating general status and warning information of a vehicle 12.

Specifically, FIG. 9(*a*) indicates the diagnostic status of the vehicle lamps, brake fluid, brake pad wear, coolant level and washer fluid level (all shown as ok in the figure). FIG. 9(*a*) also shows fuel level status, battery status and oil level status. A vehicle warning also appears in FIG. 9 in respect of the vehicle tyre pressures. Additional information in the figure includes the dates of the last and next vehicle services and the date of the next MOT.

FIG. 9(*b*) illustrates a screenshot showing similar information on a mobile device 18 of lower screen resolution. As with FIG. 9(*a*), the lamp status, fuel level status (73%), oil level status, brake fluid status, brake pad status, and coolant level are all shown as ok, whereas vehicle warnings are indicated in respect of vehicle tyre pressures and battery status.

Figure 10A:
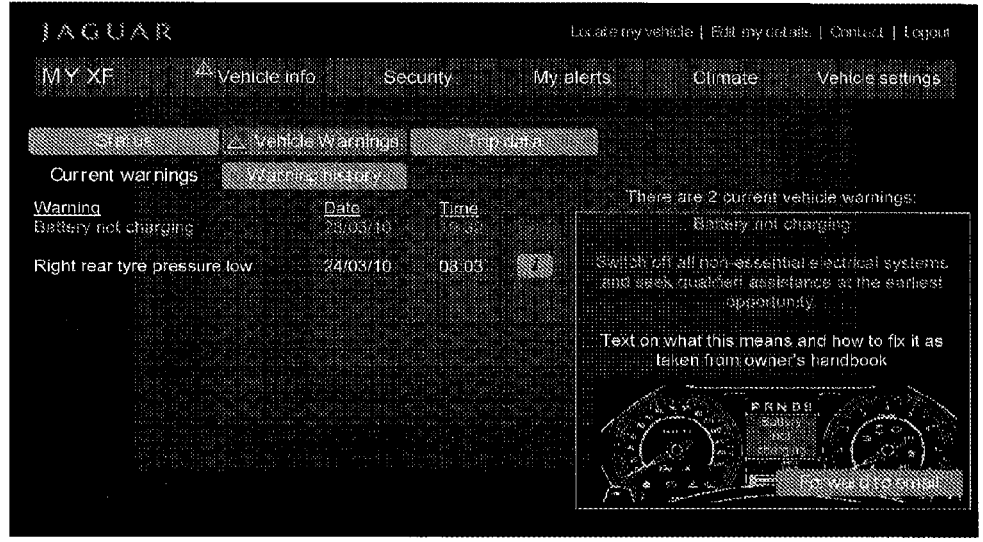
Figure 10B:
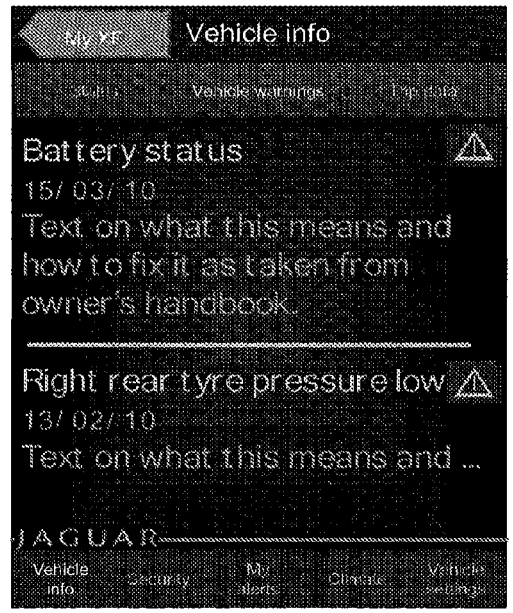

FIG. 10(*a*) shows screen shots of a GUI of a mobile device 18 indicating a log of vehicle warnings; specifically FIG. 10(*a*) shows that the right rear tyre pressure is low and the battery is not charging. FIG. 10(*b*) illustrates a screenshot showing similar information on a mobile device 18 of lower screen resolution. In this instance, the screenshot shows a battery status warning and a warning that the right rear tyre pressure is low.

Event Alert

After engine stop, it is quite possible that events may occur within the vehicle systems or subsystems which warrant user notification. These include, but are not limited to, safety and security events, for example, door lock or unlock, door tampering, triggering of the vehicle alarm or immobiliser, tyre pressure loss, engine start, vehicle movement, boot or bonnet unlock or opening, etc.

According to an embodiment of the present invention, a CAN message may be generated on the CAN bus 24 when the status of any of the vehicle systems or subsystems changes. The CAN message is generated and transmitted onto the CAN bus by the appropriate microcontroller and is received by the DTU 22. The DTU 22 converts the CAN message into the corresponding event message by means of the look-up table and transmits the event message to the web portal 14 over the GSM network 13.

In some embodiments the event message is arranged to indicate a new state of the system that has changed. For example, in the case of a change of state of the vehicle locking system, available states include unlocked, part locked, central locked, double locked and theft protect without double lock.

It is to be understood that each change of state of a system is reported as a CAN message on the CAN bus 24. For example, if the vehicle is configured for single point entry and the vehicle is unlocked, a CAN message is generated on the CAN bus 24 when the vehicle is subsequently part locked, and a further CAN message sent when the vehicle is subsequently fully unlocked.

In some embodiments the DTU 22 is arranged to detect each CAN message and to report each such message to the web portal 14. In some embodiments, a single event message may be generated and reported to the web portal 14 when one of a plurality of CAN messages are detected. For example, the events 'part locked' and 'unlocked' may be communicated in a single event message indicating the vehicle is in an 'unlocked' state.

Similarly, the CAN messages corresponding to a change of state of the locking system to a central locked state, double locked state and theft protect without double lock state may be summarised in a single event message indicating the vehicle is in a 'locked' state.

It is to be understood that other event messages corresponding to other CAN messages may also be generated. For example, an event message may be generated when the state of any of the doors or boot or bonnet changes. In the case of a change of state of a door, the event message may contain an indication as to which door was opened or closed.

It is to be understood that in the case that each change of state is sent as an event message, opening a door and subsequently closing a door will cause the generation of two event messages. It is to be understood that in the case that four persons enter the vehicle each through a separate door, eight event messages may be transmitted corresponding to changes of state of each of four doors of the vehicle.

In some embodiments a filter is implemented in respect of the doors, boot and bonnet such that each one must assume a new state for at least one second before an event message is generated. This is to prevent unwanted event messages being generated due to switch bounce when a door, boot or bonnet is closed.

In some embodiments, an event message corresponding to an external door tamper event is generated only if the vehicle is in a state in which the vehicle alarm is active. In some embodiments the event message is generated only if the door handle input is active for more than 200 ms.

The event message may be generated in response to detection of tampering with a door or a tail gate release device.

In some embodiments of the invention the system is arranged to determine whether a user of the vehicle 12 is within a certain distance of the vehicle 12 before sending one or more alerts. For example, if the system determines that the user is within a certain distance of the vehicle 12 (for example by means of a bluetooth connection, GPS and/or any other suitable means) the system may determine that if a CAN message corresponding to a door tamper event is detected, an event message corresponding to the door tamper CAN message should not be transmitted to the web portal 14.

In some embodiments the DTU 22 is arranged not to transmit certain event messages upon detecting a corresponding CAN message unless one or more other criteria are met within a given time period of the CAN message being detected.

For example, in some vehicles the door handle must be actuated in order to allow the door to be unlocked, for example by inserting a key or other device into a lock that is accessible only when the handle is actuated. In such embodiments the DTU 22 may be arranged to wait for a prescribed period of time following actuation of the handle, such as a certain number of seconds, before transmitting an event message corresponding to a door tamper event. The DTU 22 may be arranged such that if a CAN message corresponding to a door unlock command is detected within (say) two seconds of the door handle being actuated the DTU 22 will not to send an event message corresponding to a door tamper. It is to be understood that instead of a key the door may be unlocked by means of an RFID tag or other suitable means.

In some embodiments an event message may be generated when the vehicle alarm is triggered. The event message may contain the reason for the alarm being triggered. For example, the event message may provide an indication as to which of a plurality of reasons led to triggering of the alarm. For example, the event message may provide an indication that the alarm was triggered due to a change in vehicle power drain, a change in inclination of the vehicle provided by an inclination sensor, a change in volume provided by a volumetric sensor, opening of a door, the boot (tailgate) or the bonnet, activation of a siren, an attempt to start the vehicle, a module was disconnected from the CAN bus 24 and/or a door latch status changed. Again, in some embodiments a single event message may be generated and transmitted to the web portal 14 when one of a plurality of such CAN messages are generated on the CAN bus 24. For example, the reason for alarm triggering may be transmitted as being due to a door when a CAN message corresponding to a door, the boot or the bonnet has been tampered with.

It is to be understood that by the term 'tamper' is meant that an attempt to open the door or tailgate using the corresponding release device such as the door handle has been made by an unauthorised person.

In some embodiments, the DTU 22 is arranged to monitor a state of charge of a battery of the vehicle 12 (for example by measuring the battery voltage) and to generate a 'low battery' event message if the voltage drops below a prescribed threshold value. The threshold value may be stored in the NVRAM module 34.

In some embodiments, a vehicle 12 may have one or more propulsion batteries, a propulsion battery being a battery arranged to supply power to an electric machine arranged to propel the vehicle 12. Such vehicles include electric vehicles and hybrid electric vehicles (HEVs). In such vehicles the DTU 22 may be arranged to monitor the state of charge of the one or more propulsion batteries in addition to or instead of any other battery of the vehicle 12 and to provide an alert to a user in the event that the state of charge falls to or below a prescribed threshold value.

In some embodiments, when the ignition is off the DTU 22 monitors the battery voltage at intervals, for example once every four hours. In some embodiments, when the ignition is on the battery is monitored substantially constantly.

Alternatively or in addition the DTU 22 may be arranged to determine when a 'low battery' (or similar) CAN message is transmitted on the CAN bus 24 and to provide a corresponding alert to a user.

In some embodiments, once a low battery event message has been generated the DTU 22 may be prevented from sending a further low battery event message until the voltage has increased above the threshold level by a prescribed amount, for example one volt.

Other event messages may also be generated in response to CAN messages transmitted on the CAN bus 24. For example, events indicative of harsh acceleration, harsh deceleration, overspeeding, vehicle idle, driving at optimum speed, a low fuel level, a rapid loss of fuel, an engine fault, a gearbox fault, a low oil level and/or a brake system fault may also be generated.

In some embodiments a CAN message is transmitted on the CAN bus if an intruder is detected in the vehicle 12. In some embodiments the intruder may be detected by means of a motion sensor such as a passive infra-red (PIR) detector or an ultrasonic detector. In some embodiments a heartbeat of the intruder is detected, for example by means of pressure waves such as sound waves.

The web portal 14 receives the event message and updates the database with the new status information. Then, depending on system configuration or user preferences, the web portal 14 transmits an alert message to the user's mobile device 18 or personal computer 16, for example by SMS message, VOIP, email etc.

It is envisaged that the user can select when, how and for which events alerts are transmitted. For example, the user may wish to receive alerts relating to alarm activation or unauthorised engine start or vehicle movement immediately and select that the web portal transmits such alerts by SMS message. On the other hand, the user may prefer that other, lower priority events are not sent as SMS alerts, but are sent as an email.

Multiple alerts can be generated for each type of event, and the user can select to be alerted by one or several methods for each event. The user is also able to set timing preferences for alerts. The above described user-configuration can be set using the GUI on the web-portal 14 or on the mobile device 18 for uploading to the web portal 14 via the GSM network 13. By way of example, see FIGS. 11(*a*)-11(*c*) which illustrate screenshots of a GUI on a mobile device 18 for setting the user configuration.

Figure 12A:
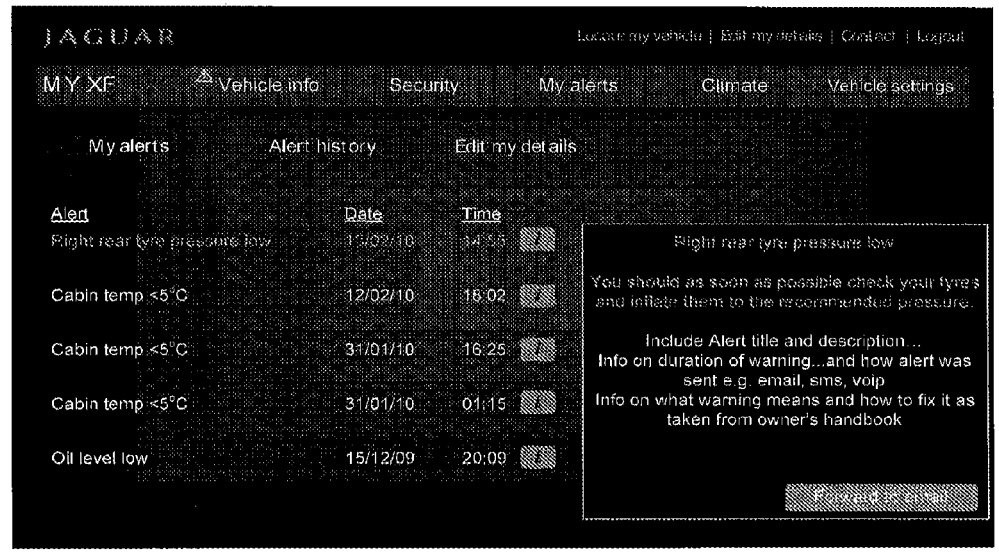
Figure 12B:
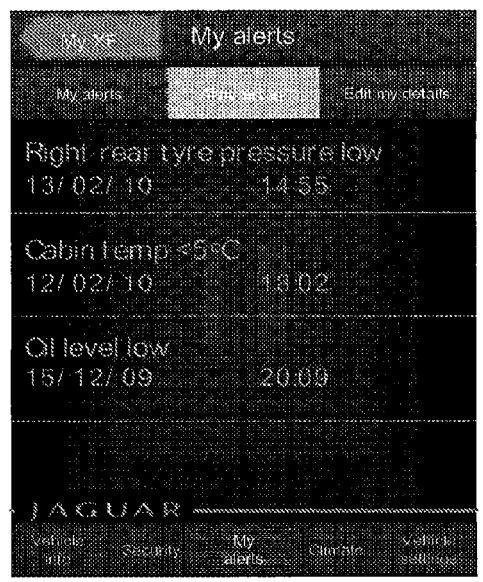

It is to be understood that the web portal 14 may log all event messages received in a log for inspection by the user. FIGS. 12(*a*) and 12(*b*) illustrate screenshots of a GUI on a mobile device 18 indicating a log of event alerts.

Figure 13A:
Figure 13B:
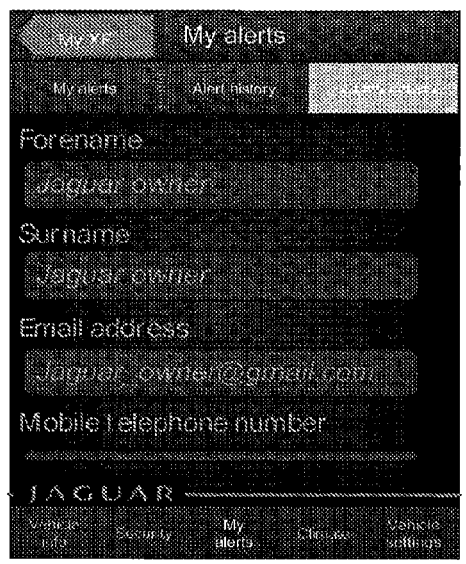
Figure 14:
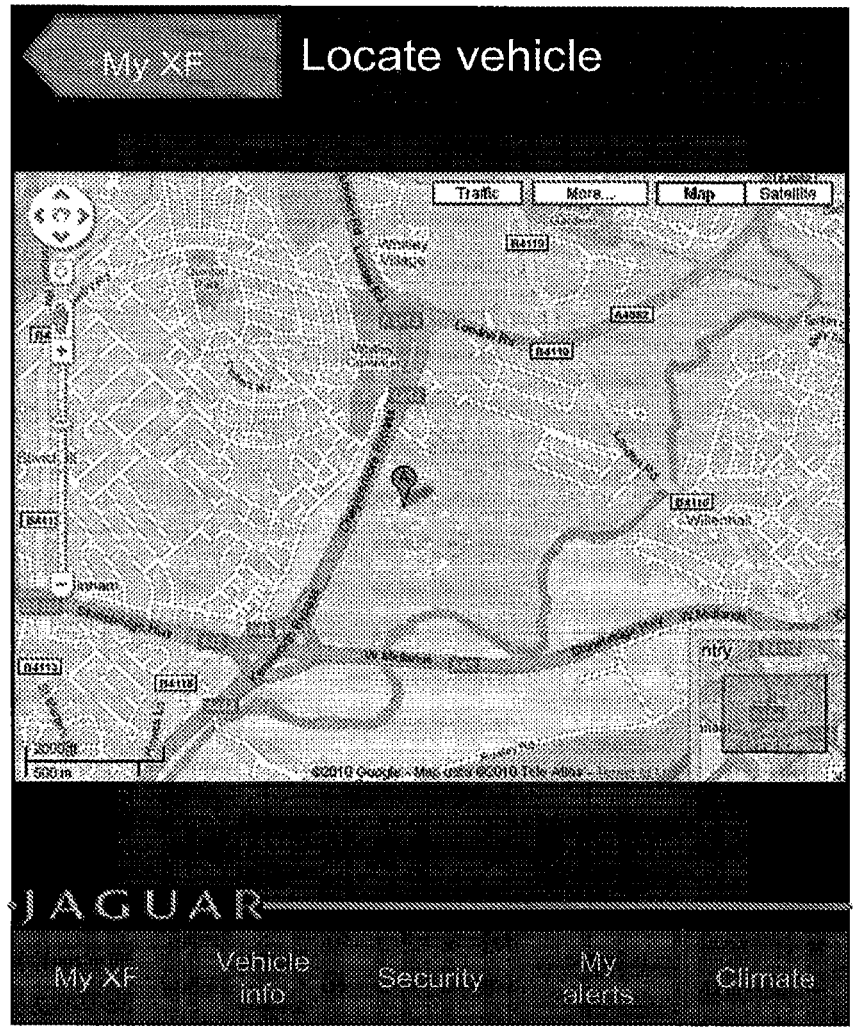

In addition to being able to select the manner in which event alerts are reported, the user may amend the contact details associated with said alerts, for example the telephone number for SMS alerts and phone messages or email address for email alerts. FIGS. 13(*a*) and 13(*b*) illustrate screenshots of a GUI on a mobile device 18 for amending the user's personal information including telephone number(s) and email address.

In some embodiments, in the event that it is determined that the vehicle is being driven by an unauthorised user, the DTU 22 may be arranged to transmit position information to the web portal 14 at intervals or substantially constantly.

In some embodiments the DTU 22 may be arranged to transmit vehicle status information to the web portal 14 at predefined times or upon the occurrence of a predefined event.

For example, at the end of a journey when the vehicle ignition is switched off the following information may be sent to the web portal 14: vehicle position (e.g. GPS or other geographical coordinates), amount of fuel used during the journey, a fuel economy attained during the journey (such as an average value of miles per gallon or kilometers per liter of fuel consumed), time at idle, time at optimum speed, distance traveled, an odometer reading, a fluid level status such as an oil level, fuel level, washer fluid level, coolant level or any other fluid level, exterior lamp status such as an indication of failure of a lamp. Other information may be transmitted in addition or instead.

During the course of a journey the web portal 14 may be updated at intervals in respect of whether the vehicle is stationary or moving, the value of vehicle battery voltage, coolant temperature, fluid level such as a fuel level, oil level, coolant level or any other fluid level, odometer reading and/or distance traveled since the start of the journey, vehicle lock status, door status, tyre pressure status, exterior lamp status such as an indication of failure of a lamp and/or tyre pressure status. Other information may be transmitted in addition or instead.

In some embodiments a position of the vehicle may be displayed on a map viewable upon accessing the web portal 14. Alternatively or in addition the information may be transmitted to the user's mobile device for viewing on a map.

In some embodiments the web portal 14 is arranged to notify a user of the occurrence of an event by means of an audio call. The audio call may be arranged to replay a prerecorded message. The message may be specific to the event that has occurred. Other arrangements are also useful.

Figure 11A:
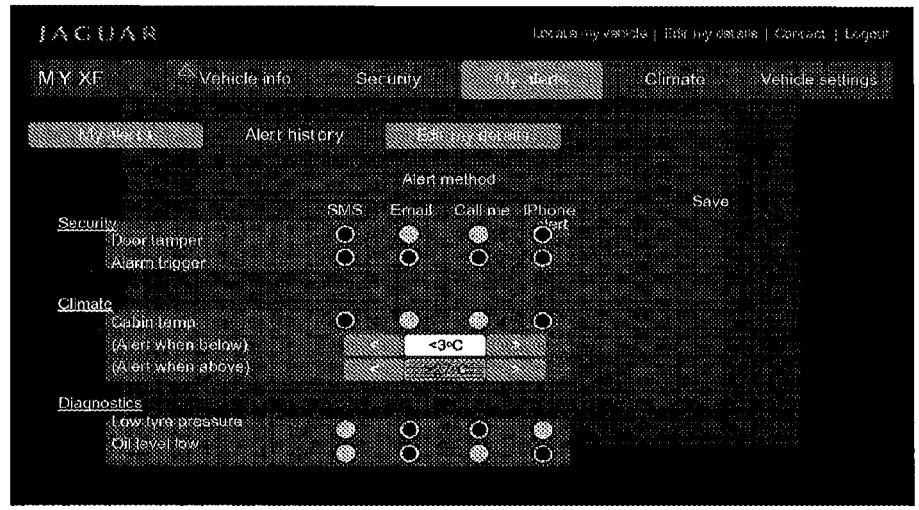
Figure 11B:
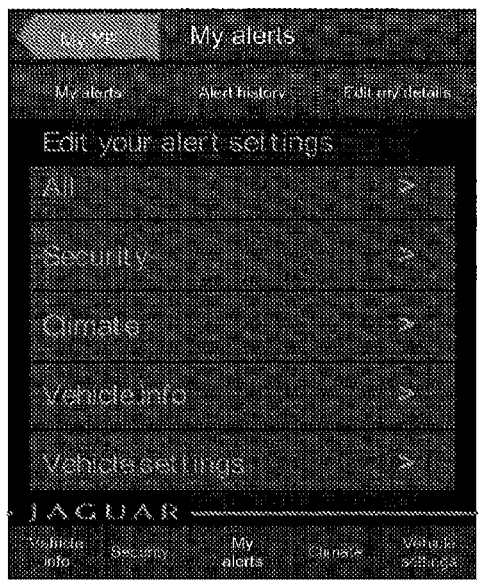
Figure 11C:

The system may be arranged to allow a user to determine the manner in which each of one or more alerts are received thereby to personalise system settings according to their preferred method of communication of a given alert (see FIGS. 11(*a*) and 11(*c*)).

The web portal 14 may be arranged to allow a given one or more alert messages and/or other messages to be communicated to a plurality of users.

For example, the system may be arranged to transmit one alert such as a battery low alert message to the user and to a third party, such as a department of the vehicle manufacturer for example a warranty department. The system may be arranged to transmit an alarm activation alert to the user and not to a third party, or to the user and a third party such as a security company or the operator of a car park in which the car is parked. Other arrangements are also useful.

In some embodiments the web portal 14 may be arranged to provide a reminder in respect of a timeout of a period such as a period for which a fee has been paid to park a vehicle, for example in a car park.

In some embodiments, the system may be arranged to provide an alert to a user in the event that a trailer coupled to the vehicle 12 becomes disconnected. For example, the trailer may be disconnected by a thief whilst the vehicle 12 is left unattended in a car park. Thus, the user can be alerted to the theft of the trailer.

Vehicle Control

A third functionality of an embodiment of the present invention is the ability to remotely control vehicle functions, systems or subsystems.

For example, remote control may be possible with the vehicle in a parked condition with the doors locked and the vehicle unoccupied.

One non-limiting application of this function is in "preconditioning" the vehicle before use. For example, the user may wish to activate the heated seats or HVAC system to increase the cabin temperature or demist/defrost the windscreen prior to use.

Indeed, substantially any control command that may be transmitted on the CAN bus 24 for activating or operating a vehicle function can be sent by the web portal 14 to the DTU 22 for conversion into the appropriate CAN message and transmission onto the CAN bus 24. That is to say that substantially any function, system, subsystem or device on the vehicle 12 that is normally activated, controlled or operated in response to CAN messages on the CAN bus 24 can likewise be activated, controlled or operated through transmission of a control message from the web portal 14 over the GSM network 13.

This can be achieved because, importantly, the DTU 22 is capable of receiving the control messages, converting them into the corresponding CAN protocol format and generating and transmitting the CAN messages onto the CAN bus 24.

Indeed, in some embodiments the user is even able to generate an <ENGINE START> command or instruction using the web portal 14 or mobile device 18 GUI. A graphical switch, slider or icon is provided on the GUI which, when selected or activated, transmits an <ENGINE START> control message via the GSM network 13 to the web portal 14.

The web portal 14 re-transmits the <ENGINE START> control message to the vehicle 12 via the GSM network 13 where it is received by the transceiver unit 30 in the DTU 22, converted into the appropriate CAN message by the microprocessor 26 using the look-up table in the NVRAM module 34, and transmitted onto the CAN bus 24, causing the Engine Control Unit (ECU) to start the internal combustion engine of the vehicle 12.

The applicants have recognised that in some territories remote engine start is illegal on public roads. The GUI on the mobile device 18 or web portal 14 may therefore request confirmation or authorisation that remote engine start should be performed before issuing the <ENGINE START> control message.

Alternatively, or in addition, before issuing the <ENGINE START> control message, the web portal 14 may interrogate the GPS unit 32 in the DTU 22 to determine the current location of the vehicle 12. The GPS coordinates of the vehicle 12 are transmitted to the web portal 14 over the GSM network 13 by the transceiver unit 30 and are compared with, or superimposed on, map data stored in the web server hosting the web portal 14. If it is determined by the web portal 14 that the vehicle 12 is located on a public road, then remote start of the vehicle 12 is prevented.

Due to the resolution limitations of commercially available GPS data, it is envisaged that other vehicle data may be used to validate the positional estimation from the GPS unit 32. For example, vehicle heading or inclination may be used to estimate whether the vehicle 12 is on a public road or parked in a driveway or car park adjacent to the road—vehicles parked at an angle to an adjacent public road are unlikely to be located on the road itself. Similarly, time elapsed since engine stop could be used to estimate the position of the vehicle 12, since vehicles parked for very long periods of time are unlikely to be left on public roads.

In some embodiments, if the vehicle engine is started remotely the vehicle may be considered to be in a 'remote idle' mode. In this mode the vehicle 12 may be configured such that it is not possible to drive the vehicle and such that any attempt to take the vehicle out of a park mode will cause the engine to stall.

In some embodiments the vehicle 12 is configured such that if a user enters the vehicle and presents suitable identification (such as a key or a key fob or other item required in order to start the vehicle) the vehicle will exit the remote idle mode and enter a non-remote idle mode. The user is then able to operate the vehicle (e.g. by driving the vehicle) as if they had started the vehicle in person and not remotely.

In some embodiments the user may communicate with the web portal 14 and/or the vehicle 12 directly from their mobile communications device 18 in order to determine the location of the vehicle 12 and to obtain directions from their present location to the vehicle 12. Thus the mobile device 18 may be arranged to interrogate the web portal 14 or the vehicle 12 directly via the transceiver module 30 in order to determine the vehicle location. Other arrangements are also useful.

The mobile device 18 may determine its current location from location determining means provided within the device 18 itself.

The mobile communications device 18 may be arranged to provide directions from the user's current location by means of a GUI such as a street map, a street view (such as by means of Google Earth™) or any other suitable GUI including a compass-like display. For example the device 18 may display an arrow pointing in the direction of the vehicle 12 in order to direct the user straight to the vehicle.

It is to be understood that the device 18 may be arranged to communicate directly with the vehicle 12 for example by Bluetooth® or other short range radio or similar communications means.

In some embodiments the vehicle may be unlocked remotely via the GSM network 13. In the event that a door is unlocked by an unlock command but no door (or boot/tailgate) opened within a prescribed period of time the vehicle may be arranged automatically to relock.

In some embodiments the system allows a window to be opened or closed remotely. In some embodiments a global open or close command may be sent, causing all the windows to open or close, respectively. It is to be understood that the global close feature may rely on inbuilt anti-trap functionality of the window lift system to ensure no object is trapped by a window during closure of the window.

In some embodiments a retractable roof of the vehicle 12 may be opened or closed remotely.

In some embodiments a boot or tailgate of the vehicle 12 may be released remotely. In some embodiments, in vehicles having automated boot or tailgate closure devices the devices may also be actuated remotely thereby to close the boot or tailgate.

In some embodiments other features may be remotely activated or deactivated such as a valet mode feature. The valet mode may be a mode in which access to certain parts or features of the vehicle may be prevented or limited. For example, vehicle performance parameters such as maximum speed and/or acceleration may be limited within valet mode.

In some embodiments a suspension of the vehicle may be raised or lowered remotely. In some embodiments a configuration of the exterior lighting of the vehicle may be changed in order to meet different requirements under different circumstances.

For example, in the event a vehicle is driven between locations having different legislative requirements for vehicle exterior lighting configurations, the exterior lighting may be changed remotely in order to meet legislative requirements.

Thus if a vehicle 12 is driven between countries in which traffic is required to drive on different sides of a road the lighting configuration (such as a beam direction of headlamps of the vehicle) may be changed remotely.

In some embodiments a climate control system or heating, ventilation and air conditioning system (HVAC) of the vehicle 12 may be controlled. For example it may be possible to control whether or not the climate control system is in an automode. It may also be possible to adjust a blower speed, driver temperature selection, passenger temperature selection and any/or other suitable parameter.

In some embodiments a method is provided for locating a vehicle by a user, for example if the vehicle is in a large car park. Thus, in some embodiments the user may operate his mobile communications device 18 to cause one or more lights of the vehicle to illuminate, for example the headlamps, or the horn of the vehicle to sound. Other arrangements are also useful.

In some embodiments, the user may be permitted to transmit an engine stop command thereby to cause the engine of the vehicle to stop. This command may be referred to as a remote engine stop command. In some embodiments the remote engine stop command will only be acted upon by the DTU 22 if the engine is idling in the remote idle mode. In other words, the remote engine stop command will only be acted upon if the engine was started remotely, thereby entering a remote idle mode, and has not transitioned into the non-remote idle mode since the engine was started. Other arrangements are also useful.

The DTU 22 may be arranged to inhibit certain other commands received by the wireless transceiver unit 30 from being executed (by transmission of the corresponding CAN message onto the CAN bus 24) under certain circumstances. For example, the DTU 22 may inhibit remote opening of a door, boot/tailgate or bonnet if it is detected that the vehicle 12 is moving.

It is to be understood that the feature of allowing the engine to be started remotely enables features of the vehicle 12 that require the engine to be running to be operated remotely. For example, heating systems such as a window demister, a cabin heater, a seat or steering wheel heater, a fuel powered heater or a cooling system such as an air-conditioning system may each require the engine to be running.

In some embodiments the user may initiate downloading of data to the vehicle remotely. For example, the user may initiate downloading of navigation data, such as data corresponding to a journey the user intends to make such as destination and/or a route, or other data such as music data or other entertainment-related data.

In the event that the DTU 22 receives a command to switch off the engine whilst the vehicle 12 is moving (for example if the user detects that the vehicle 12 has been stolen) the DTU 22 may be arranged to control the vehicle 12 such that the vehicle 12 comes to a controlled stop before switching off the engine.

Vehicle Location

As described above, in one embodiment, the user is able to request information on the vehicle's location. The request may be sent in the manner described above with reference to a status request. In this case, a <VEHICLE POSITION> status request is generated by the web portal 14, in response to the user making such a request on an internet connected computer 16 or on a mobile device 18, and transmitted to the vehicle 12.

The position request is received by the transceiver unit 30 in the DTU 22 and sent to the microprocessor 26. The microprocessor 26 requests the GPS coordinates of the current vehicle location from the GPS receiver 32 and instructs the transceiver unit 30 to transmit these coordinates to the web portal 14 over the GSM network 13.

The GPS coordinates are received by the web portal 14 which superimposes the coordinates onto map data extracted from the internet or held on the web portal's server. The map data, showing the vehicle's location superimposed thereon is then available to view by the user using an internet connected computer 16. Alternatively, or in addition, the map data with the vehicle location superimposed thereon is transmitted by the web portal 14 to the user's mobile device 18 for display on the GUI (for example, see FIG. 14).

In an alternative method, the vehicle GPS coordinates as determined by the GPS receiver 32 are uploaded to the web portal 14 during the "bulk dump" of vehicle status information on engine stop, as described above. This advantageously obviates the need to transmit the <VEHICLE POSITION> status request to the vehicle 12 since the position data is already held by, and accessible from, the web portal 14, thereby improving power management of the system.

Journey Monitoring

A related feature of an embodiment of the invention is the ability for the user to view, track or monitor vehicle movement. By transmitting the vehicle's GPS coordinates at regular intervals to the web portal 14, in the manner described above, the route taken by the vehicle 12 can be plotted on map data for view by the user.

On the other hand, at the end of a journey, data relating to that journey can be uploaded to the web portal 14 as part of a vehicle status "bulk dump", described above. Data relating to, for example, route start and end points, distance, route taken, time of journey, average speed, maximum speed attained, average fuel economy and other information can be obtained from the relevant vehicle systems and subsystems by generation and transmission onto the CAN bus 24 of the appropriate CAN messages (status requests) by the DTU 22.

Figure 15D:

FIGS. 15(a)-15(e) illustrate screenshots of GUI on a mobile device 18 indicating trip data for a vehicle 12. Specifically, FIG. 15(a) shows trip data relating to the last journey undertaken by the vehicle including date, start and finish times, duration, distance, fuel consumption, vehicle mileage and average speed. The screenshot also shows the route taken by the vehicle 12 on a map. FIG. 15(b) illustrates a screenshot of a GUI on a mobile device 18 of lower screen resolution showing a menu screen by which the user may select trip data to be displayed. FIG. 15(c) illustrates a screenshot of a GUI on a mobile device 18 of lower screen resolution indicating last trip data and a graphical representation of the journey on a map.

Figure 15E:
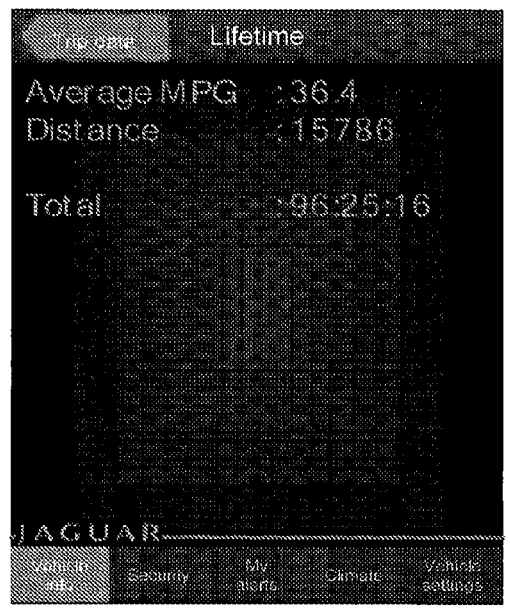

FIG. 15(d) illustrates a screenshot of a GUI on a mobile device 18 indicating lifetime trip data. FIG. 15(e) shows a screenshot of a GUI on a mobile device 18 of lower screen resolution indicating a summary of lifetime trip data for the vehicle 12.

Power Management

The applicant has recognised that power management may be important in the practical implementation of the present invention. The transceiver unit 30 may require a considerable amount of power to remain in an active state in order to listen for status request or control messages transmitted by the web portal 14 via the GSM network 13. Likewise, transmission of event messages by the transceiver unit 30 also requires power, although on an intermittent rather than continuous basis. Operation of the transceiver unit 30 may cause a significant current drain on the vehicle battery which is used to supply power to the DTU 22.

In order to address this problem, various power control strategies have been developed for controlling the DTU 22. In one example, the DTU 22 is operated in a first mode, for example a fully active mode wherein the transceiver unit 30 operates in a continuous receiving mode, for a first predetermined period of time following engine stop. This predetermined period of time may range from hours to days or weeks, and may be selectable by the user using the GUI of the web portal 14 or the mobile device 18 or may be determined by the microprocessor 26 in dependence on the charge state of the battery.

When the first predetermined period has expired, the transceiver unit 30 may be switched to a second mode, which may be an intermittent mode, for a second predetermined period of time. In the second mode, the transceiver unit 30 may be activated to receive status request or control messages from the web portal over the GSM network 13 only for short lengths of time at predetermined intervals, for example once per hour.

In a third mode, the DTU 22 is deactivated or powered down to a quiescent state in which status request or control messages transmitted to the vehicle 12 by the web portal 14 are not received by the transceiver unit 30. On the other hand if, after engine stop, an event occurs, the automatic generation and transmission onto the CAN bus 24 of the relevant CAN message by the associated microcontroller, and the reception thereof by the microprocessor 26 in the DTU 22, will activate or wake up the transceiver unit 30 for transmission of the event message to the web portal 14.

Alternatively, or in addition, in the third mode, only event messages relating to high priority events within the vehicle systems may be notified to the user. For example, an event in which immediate action or investigation is required, such as triggering of the vehicle alarm system, is transmitted to the web portal 14 by the DTU 22. However, non urgent events, such as a reduction in tyre pressure, are not transmitted to the web portal 14 by the transceiver unit 30.

In the same or another embodiment, the operation of the DTU 22 is determined based on historical usage. For example, the DTU 22 may determine that the user generally does not make control or status requests to the vehicle 12 during particular hours, such as overnight. In this case, the DTU 22 may be powered down during night-time hours.

In one embodiment, the user is able to manually place the DTU 22 into a quiescent state. For example, the user may set a "vacation" flag on the mobile device 18 or the personal computer 16 which is uploaded to the web portal 14. When the vacation flag is set, indicating that the user is on vacation and will not require to send control or status request messages to the vehicle 12, the web portal 14 generates a shut down command to the DTU 22 to place it into a quiescent state.

The duration for which the DTU 22 is operated in each mode may be set by the user or may be determined automatically in dependence on the state of charge of the vehicle battery.

Whenever the mode of the DTU 22 is changed, an event message is transmitted by the transceiver unit 32 to the web portal 14 via the GSM network. This is useful in the event that the DTU 22 is placed into a mode in which functionality is limited, for example no control or status request messages are received, or only limited event messages are transmitted. In this way, the user is informed of the limited functionality of the system.

Customisation

The prototype system developed by the applicant is fully customisable by the user. When first installed in the vehicle 12, the DTU 22 is arranged to identify specific characteristics of the vehicle to which it is fitted. This may be achieved by accessing the vehicle 12 config file that may be transmitted onto the CAN bus 24. Details including make, model and VIN number can be obtained from the vehicle config file and transmitted to the web portal 14.

In addition, vehicle specific data including registration number and colour may be input to the web portal 14 by the user, either directly using an internet connected computer or by means of their mobile device 18.

When the user accesses the web portal 14 or application software on the mobile device 18, the system prompts for a username and password to gain access to the features of the system, as shown in FIG. 3(b). Multiple usernames and passwords may be employed for multiple vehicles.

A welcome screen may be displayed showing a picture of the vehicle 12, and key vehicle status information such as location, fuel status, odometer reading, security status, etc as shown in FIG. 3(d).

The NVRAM module 34 may contain multiple look-up tables for use with multiple vehicle types. As described above, the DTU 22 identifies the vehicle make and model to which the system is fitted by means of the vehicle CONFIG file which may be transmitted onto the CAN bus 24, enabling the appropriate look-up table in the NVRAM module 34 to be selected. This arrangement advantageously means that a single system may be applied to different vehicle models, reducing development and manufacturing costs.

The present invention may advantageously be implemented as an adaption to an existing standard fleet tracker system and provides the end user with both event and status information of the user's vehicle 12 and the ability for the user to remotely control specific features on the vehicle 12. Most of the hardware requirements of the inventive system are present in the data transfer units of existing fleet tracker systems such that only software modification is required, together with an adaption to permit the unit to interface with the vehicle CAN bus 24.

The system is able to read event based data directly from the vehicle CAN bus 24 and report these events back to the host (web portal 14). The host is then able to communicate these events to the user as alerts, for example by SMS messaging, email, VOIP or through a user-specific iPhone application.

Because all communication between the user and the vehicle 12 occurs over GSM or other cellular network, the vehicle 12 can be monitored or controlled from substantially anywhere in the world using a conventional mobile device 18 or smart phone 18.

Filtering events—events may be filtered depending on battery life. Some events may be prioritised. The user can enable or disable each of the events via configuration stored in NVRAM and accessed via unified diagnostic services (UDS).

By using an externally hosted web portal as the host controller for the system, it is possible to gain access to other internet data or subscription services such as map information, email or SMS messaging services etc. to enable multiple functionality. This is not possible in a system in which the user communicates directly with the vehicle 12 from his mobile device 18.

It is envisaged that video or audio data gathered by camera or microphone systems on the vehicle 12 may be transmitted to the web portal 14 by the DTU 22. This may improve personal security by enabling the user to monitor the surrounding area before returning to the vehicle 12.

While the present invention has been described in the context of a remote interactive system for a vehicle 12, the invention may also find application for remotely interacting with other objects or property, such as buildings. In this case, the DTU 22 may be integrated into a building security system for transmitting status or event information to a remote user, or for receiving control commands from the user via the GSM network 13.

In some embodiments the invention may allow contactless transaction processing. For example embodiments of the invention may allow payment for items such as fuel, car parking, highway tolls and other items such as fast food to be made.

In some embodiments the system may be employed to locate a vehicle 12 that has been stolen. It is to be understood that the system may be arranged to report the location of the vehicle 12 to a user (or other authorised person such as a law enforcement officer). Thus the location may be determined and a recovery operation begun.

It is to be understood that some embodiments of the present invention have the advantage that, because data in respect of vehicle status may be reported to a web portal 14, if the DTU 22 of the vehicle 12 is disabled a position of the vehicle 12 at or before the time the DTU 22 became disabled may still be determined. Thus, the user may determine this position by reference to data stored in a database of the web portal 14 and the last reported position of the vehicle 12 stored there.

In some embodiments the system may be arranged to allow a key fob to be located.

In some embodiments of the invention the DTU 22 is arranged to determine user-customised settings of the vehicle 12 which may include settings such as a seat position, and to store data corresponding to these settings in the database of the web portal 14. The settings may subsequently be downloaded to the DTU 22 of another vehicle 12. For example the settings might be downloaded to a vehicle 12 that the user will temporarily drive such as a rental vehicle.

This feature allows a user's enjoyment of the other vehicle to be increased since the user does not have to spend time adjusting the vehicle's user-customisable settings before driving the other vehicle.

The above description provides examples of numerous embodiments, features and applications of an apparatus, a system, a method and a vehicle. It will be fully appreciated by the skilled person, and is hereby expressly stated, that these embodiments, features and applications can be combined in any desirable manner and that each and every such combination is envisaged and claimed within the scope of this application, except where there is an obvious incompatibility of features.

The invention claimed is:

1. A system for monitoring and/or controlling a vehicle, the system comprising:
    a data transfer unit that receives data signals transmitted on a vehicle data bus relating to the status and/or operation of one or more vehicle systems or devices; and
    a transceiver that wirelessly transmits information relating to one or more of said received data signals to a mobile communications device via a web server, web portal or other internet-connected host system, for display to a user, the transceiver having a first mode in which it is operable to receive control messages from the web server, web portal or other internet-connected host system and a quiescent mode in which the transceiver is not operable to receive control messages from the web server, web portal or other internet-connected host system,
    wherein the web server, web portal or other internet-connected host system is arranged to receive a vacation control message from the mobile communications device, said vacation control message indicating that the user wishes to place the transceiver in the quiescent mode for a user-defined period of time, the web server, web portal or other internet-connected host system being further arranged to transmit a shut down control message to said transceiver,
    wherein, upon receipt of said shut down control message by said transceiver, the system is operable to place said transceiver in said quiescent state for said user-defined period of time.

2. A system as claimed in claim 1, wherein the data transfer unit is arranged to generate data signals for transmission onto the vehicle data bus for controlling one or more vehicle systems, functions or devices.

3. A system as claimed in claim 1, wherein the data transfer unit is arranged to receive the data signals from the data bus and convert the data signals into data messages corresponding to the data signals for transmission by the transceiver.

4. A system as claimed in claim 3, wherein the data transfer unit is arranged to encrypt the data messages before transmission by the transceiver.

5. A system as claimed in claim 1, wherein the vehicle bus is a CAN bus and wherein the data transfer unit is arranged to receive CAN messages transmitted onto the CAN bus by vehicle systems or subsystems and to store said messages in a memory.

6. A system as claimed in claim 1, wherein, after an engine of the vehicle is stopped, transmission of data messages and reception of control messages by the transceiver is suspended when voltage of a vehicle battery reaches a predetermined threshold.

7. A system as claimed in claim 1, wherein transmission of data messages and reception of control messages by the transceiver is suspended after a first predetermined period after an engine of the vehicle is stopped.

8. A system as claimed in claim 7, wherein transmission of data messages and reception of control messages by the transceiver continues intermittently for a second predetermined period after the first predetermined period has elapsed.

9. A system as claimed in claim 6, wherein the transceiver is responsive to transmit data messages having a high priority at any time after the vehicle engine has stopped.

10. A system as claimed in claim 1, wherein the transceiver is operated intermittently to transmit data messages and receive control messages based on historical usage thereof by the user.

11. A system as claimed in claim 1, wherein, when the transceiver is in the quiescent mode, only messages relating to high priority events within the vehicle are notified to the user.

12. A method of interacting remotely with a vehicle, the method comprising at least one of:
   a) sending a control message remotely from a mobile communications device, via a web server, web portal or other internet-connected host system, to a transceiver located within the vehicle, translating the control message into a corresponding control data signal and transmitting said control data signal onto a vehicle data bus located within the vehicle and controlling at least one of a vehicle system, vehicle function or vehicle device;
   b) receiving a status signal relating to status or operation of one or more vehicle systems or devices from a vehicle data bus located within the vehicle, converting the received data signal into a data message and wirelessly communicating the status message from a transceiver located within the vehicle to the mobile communications device, via the web server, web portal or other internet-connected host system; and
   c) sending a vacation control message from the mobile communications device to the web server, web portal or other internet-connected host system, said vacation control message indicating that a user wishes to place the transceiver in a quiescent mode for a user-defined period of time.

13. A method as claimed in claim 12, further comprising:
   d) upon receipt of said vacation control message, transmitting a shut down control message from the web server, web portal or other internet-connected host system to said transceiver; and
   e) upon receipt of said shut down control message by said transceiver, placing said transceiver in a quiescent state in which the transceiver is not operable to receive control messages from the web server, web portal or other internet-connected host system for said user-defined period of time.

14. A method as claimed in claim 12, further comprising measuring a voltage level of a battery of the vehicle after an engine of the vehicle has stopped, and suspending transmission of data messages and reception of control messages by the transceiver when the vehicle battery voltage level reaches a predetermined threshold.

15. A method as claimed in claim 12, farther comprising measuring time after an engine of the vehicle has stopped, and suspending transmission, of data messages and reception of control messages by the transceiver after a first predetermined period of time has elapsed.

16. A method as claimed in claim 15, further comprising measuring time after the first predetermined period of time has elapsed, and intermittently transmitting data messages or receiving control messages by the transceiver for a second predetermined period of time after the first predetermined period of time has elapsed.

17. A method as claimed in claim 14, further comprising transmitting data messages having a high priority from the transceiver at any time after the vehicle engine has stopped.

18. A method as claimed in claim 12, further comprising operating the transceiver intermittently to transmit data messages and receive control messages based on historical usage thereof by the user.

19. A method as claimed in claim 12, further comprising notifying to the user only messages relating to high priority events within the vehicle when the transceiver is in the quiescent mode.

20. A vehicle comprising the system of claim 1.

* * * * *